US012682764B2

(12) United States Patent
Averkova et al.

(10) Patent No.: US 12,682,764 B2
(45) Date of Patent: Jul. 14, 2026

(54) SYSTEM FOR VEHICLE ENERGY VISUALIZATION

(71) Applicant: Honeywell International Inc., Charlotte, NC (US)

(72) Inventors: Dariia Averkova, Phoenix, AZ (US); Roberto Gudino, Phoenix, AZ (US); Deena Dayalan Kothandaraman, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 114 days.

(21) Appl. No.: 18/431,508

(22) Filed: Feb. 2, 2024

(65) Prior Publication Data

US 2025/0252855 A1 Aug. 7, 2025

(51) Int. Cl.

| | |
|---|---|
| ***G08G 5/22*** | (2025.01) |
| ***G08G 5/34*** | (2025.01) |
| ***G08G 5/55*** | (2025.01) |
| ***G08G 5/57*** | (2025.01) |
| ***G08G 5/58*** | (2025.01) |

(52) U.S. Cl.

CPC ................ *G08G 5/22* (2025.01); *G08G 5/34* (2025.01); *G08G 5/55* (2025.01); *G08G 5/57* (2025.01); *G08G 5/58* (2025.01)

(58) Field of Classification Search

CPC .. G08G 5/22; G08G 5/57; G08G 5/55; G08G 5/58; G08G 5/34

See application file for complete search history.

(56) References Cited

U.S. PATENT DOCUMENTS

| | | | | |
|---|---|---|---|---|
| 7,797,102 | B2 | 9/2010 | Fortier | |
| 8,774,989 | B1 * | 7/2014 | Bush | B64D 43/02 701/16 |
| 11,385,694 | B1 | 7/2022 | Foland et al. | |
| 11,449,078 | B1 | 9/2022 | Freiheit | |
| 11,710,413 | B1 | 7/2023 | Ferrier et al. | |

(Continued)

FOREIGN PATENT DOCUMENTS

| | | | |
|---|---|---|---|
| EP | 3923260 | A1 | 12/2021 |

OTHER PUBLICATIONS

Extended European Search Report Mailed on Jun. 11, 2025 for EP Application No. 25150938, 11 page(s).

*Primary Examiner* — Jacob M Amick

(74) *Attorney, Agent, or Firm* — Alston & Bird LLP

(57) ABSTRACT

Embodiments of the present disclosure are directed to a vehicle energy monitoring (VEM) platform configured to monitor one or more vehicles. An onboard VEM system associated with a vehicle is communicably coupled to a remote vehicle operation hub associated with the VEM platform and can monitor a current energy expenditure of the vehicle as the vehicle executes a trip plan. A vehicle performance prediction model is configured to determine a predicted energy expenditure of a vehicle. Embodiments are also configured to generate, based on output from the vehicle performance prediction model, a predicted energy visualization representing the predicted energy expenditure, where the predicted energy visualization corresponds to a defined leg between a plurality of flight phases associated with the trip plan, and where the predicted energy visualization is displayed on a situation interface in relation to the defined leg between the plurality of flight phases.

20 Claims, 11 Drawing Sheets

(56) References Cited

U.S. PATENT DOCUMENTS

| | | | | |
|---|---|---|---|---|
| 2016/0363456 | A1 | 12/2016 | Pujos et al. | |
| 2021/0183255 | A1* | 6/2021 | Van Tulder | G08G 5/22 |
| 2021/0407303 | A1 | 12/2021 | Yogesha et al. | |
| 2022/0139234 | A1* | 5/2022 | Chaubey | G08G 5/21<br>701/121 |
| 2023/0154340 | A1 | 5/2023 | Foland et al. | |
| 2023/0202321 | A1 | 6/2023 | Mazzei et al. | |
| 2023/0315094 | A1* | 10/2023 | Park | G08G 5/32<br>701/3 |
| 2024/0118098 | A1* | 4/2024 | Boblett | G01C 21/3415 |
| 2025/0224243 | A1* | 7/2025 | Kang | G01C 21/3469 |

* cited by examiner

SYSTEM FOR VEHICLE ENERGY VISUALIZATION

TECHNICAL FIELD

Embodiments of the present disclosure generally relate to safely managing a trip plan associated with the operation of a vehicle, and specifically to generating predicted energy visualizations associated with a trip plan being executed by the vehicle.

BACKGROUND

The aerospace industry continues to deploy more autonomous and semi-autonomous electric and hybrid aerial vehicles for use in myriad types of environments, including densely populated urban environments. An operator may monitor the performance of an autonomous or semi-autonomous electric aerial vehicle when executing various trip plans near densely populated environments where safe stopping points (e.g., designated stopping zones, airports, vertiports, and/or safe landing zones) may be scarce. There are multiple factors that can impact the efficiency, safety, and/or operation of an electric aerial vehicle. Various sensors, monitors, and systems associated with the electric aerial vehicle may provide raw data related to particular operational components of the aerial vehicle to provide situational awareness, contextual information, and/or other helpful data to operators of the electric aerial vehicle. Operators of the electric aerial vehicle may contend with all such data to evaluate operation of a vehicle. Inventors have discovered problems with current implementations of vehicle energy management techniques related to electric aerial vehicles. Through applied effort, ingenuity, and innovation, the inventors have solved many of these problems by developing the solutions embodied in the present disclosure, the details of which are described further herein.

BRIEF SUMMARY

In general, embodiments of the present disclosure herein provide enhanced trip plan-based vehicle battery situational awareness. Other implementations will be, or will become, apparent to one with skill in the art upon examination of the following figures and detailed description. It is intended that all such additional implementations be included within this description be within the scope of the disclosure and be protected within the scope of the following claims.

In accordance with a first aspect of the present disclosure, a computer-implemented method for enhanced vehicle energy monitoring for one or more vehicles associated with a vehicle energy monitoring (VEM) platform is provided. The computer-implemented method is performable by one or more specially configured computing device(s) embodied in hardware, software, firmware, and/or any combination thereof, for example as described herein. In one example embodiment, the example computer-implemented method includes determining, based on inputting a vehicle profile and a first trip plan into a vehicle performance prediction model, a predicted energy expenditure of a vehicle by at least correlating the first trip plan with a battery state of function (SoF) associated with a vehicle battery system of the vehicle. The example computer-implemented method also includes generating, based on the predicted energy expenditure, a predicted energy visualization representing the predicted energy expenditure of the vehicle based on the first trip plan, where the predicted energy visualization corresponds to at least one defined leg between a plurality of flight phases associated with a first trip route of the first trip plan, where the predicted energy visualization is displayed on a situation interface oriented along a particular axis, in relation to the at least one defined leg between the plurality of flight phases, and where the predicted energy visualization is plotted along at least one axis of the situation interface representing a position along the first trip route. The example computer-implemented method also includes determining, via the vehicle performance prediction model, an updated predicted energy expenditure of the vehicle based on updated vehicle operation data collected in real-time, where the updated vehicle operation data comprises at least one portion of data associated with one or more factors affecting a current energy expenditure of the vehicle. The example computer-implemented method also includes dynamically updating the situation interface, in response to determining the updated predicted energy expenditure, to display an updated predicted energy visualization on the situation interface in relation to the at least one defined leg between the plurality of flight phases.

The example computer-implemented method further includes determining, based on determining the updated predicted energy expenditure, that an adverse situation is occurring. The example computer-implemented method also includes. The example computer-implemented method also includes, in response to determining that the adverse situation is occurring, displaying, via a remote vehicle operation interface, a plurality of recommendations for mitigating the adverse situation. The example computer-implemented method also includes displaying, upon selection of a first recommendation of the plurality of recommendations, an alternate predicted energy visualization associated with an alternate predicted energy expenditure based on a respective alternate trip plan on the situation interface, where the alternate predicted energy visualization is displayed in relation to at least one defined leg between a plurality of flight phases associated with the alternate trip plan.

The example computer-implemented method further includes where each of the plurality of recommendations are associated with a respective criticality related to the adverse situation.

The example computer-implemented method further includes displaying, on the situation interface, at least one vertical indicator, where the at least one vertical indicator is associated with a specific point during the first trip plan in which a corresponding recommendation of the plurality of recommendations is to be executed.

The example computer-implemented method further includes where the situation interface is a sub-interface of the remote vehicle operation interface.

The example computer-implemented method further includes where the updated vehicle operation data comprises at least one of a current load on the vehicle battery system, the current energy expenditure, a current elevation of the vehicle, one or more upcoming flight phases, one or more current environmental factors, a current battery SoF, or a current operational health of one or more vehicle systems.

The example computer-implemented method further includes where the vehicle profile comprises at least one of a vehicle type, a vehicle identifier, a vehicle battery system configuration, a number of passengers, or a vehicle payload weight.

The example computer-implemented method further includes determining that the updated predicted energy expenditure will exceed an energy reserve threshold associated with an energy reserve value of the vehicle.

The example computer-implemented method further includes where the predicted energy visualization is characterized by at least one of a color-code, shading scheme, pattern, transparency, gradient, or a shape that is determined based on one or more predicted battery parameter values associated with the predicted energy expenditure.

In accordance with a second aspect of the disclosure, a computer program product for enhanced vehicle energy monitoring for one or more vehicles associated with a VEM platform is provided. In one example embodiment computer program product, the computer program product includes at least one non-transitory computer-readable storage medium having computer program code stored thereon that, in execution with at least one processor, configures the computer program product for performing any one of the example computer-implemented methods described herein.

In accordance with a third aspect of the disclosure, an apparatus for enhanced vehicle energy monitoring for one or more vehicles associated with a VEM platform is provided. In one example embodiment, the apparatus includes at least one processor and at least one memory having computer-coded instructions stored thereon, where the computer-coded instructions in execution with the at least one processor causes the apparatus to perform any one of the example computer-implemented methods described herein. In a second example embodiment apparatus, the apparatus includes means for performing each step of any one of the example computer-implemented methods described herein.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
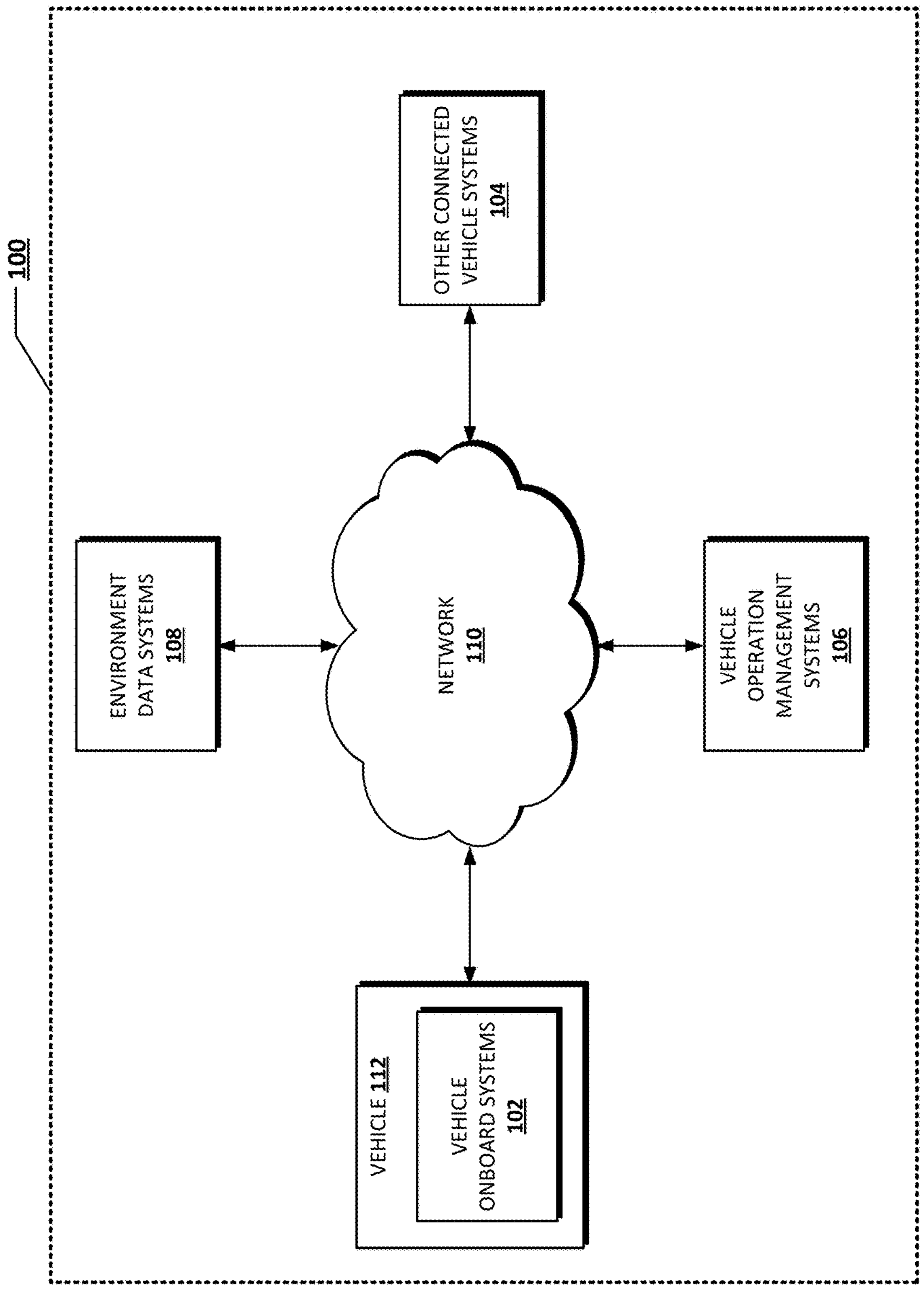
FIG. 1 illustrates an example system that enables enhanced vehicle energy monitoring in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

As the various branches of the transportation industry move ever towards semi-autonomously and autonomously controlled vehicles, upcoming operators, pilots, drivers, and/or crew members in the field may have further limited knowledge and/or limited experience with which to make crucial decisions regarding one or more adverse situations impacting the operation of the vehicle. In this regard, the cognitive workload for the operator to gain a complete situational awareness based at least in part on disparate data coming from a multitude of sources remains high, and even may increase as new inputs are considered while simultaneously requiring human operators (e.g., for regulatory purposes). In some circumstances, it is difficult or may be impossible for an operator to make an accurate decision and perform a corresponding action in a timely manner based at least in part on the many nuances of a given, often time-sensitive, situation. Indeed, a vehicle operator may have a limited amount of time and/or knowledge with which to evaluate the impact of said factors and/or raw data.

Furthermore, in scenarios in which the semi-autonomously and autonomously controlled vehicles are electric vehicles, the operators, pilots, drivers, and/or crew members associated with a respective electric vehicle should understand the amount of energy required for the execution of a particular trip plan, especially in densely populated urban environments. For example, an operator of an electric vehicle preferably should be constantly aware of the battery state of function (SoF) related to the electric vehicle before a trip begins and throughout the duration of the trip to avoid exposing the operation of the vehicle to a lack of sufficient battery to reach a particular destination, thus causing a contingency scenario. The inventors have identified that it is desirable to provide a system that enables quick decision-making for an operator responsible for an electric vehicle, as well as to have a system for quickly visualizing (e.g., to a human operator) the energy requirements for the safe execution of a particular trip plan related to the electric vehicle. Furthermore, in an emergency or other contingent circumstance, an operator should be able to see, review, and understand a contingency trip plan generated based on the prevailing battery system conditions as well as the various environmental conditions associated with the electric vehicle.

Embodiments of the present disclosure are configured to address the limitations of various vehicle management systems by providing a vehicle energy monitoring (VEM) platform configured to both predict an expected energy expenditure of a particular electric vehicle as well as monitor the operation of the electric vehicle to identify and/or mitigate one or more adverse situations that may impact the safe operation of the vehicle.

In this regard, embodiments of the present disclosure provide connectivity between a remote vehicle operation hub (RVOH) and an onboard VEM system that monitors the various vehicle systems of a respective vehicle. The RVOH is configured to host computations that are remotely configured, executed, and/or broadcast to one or more onboard VEM systems associated with one or more respective multiple vehicles associated with the VEM platform. The VEM platform provides multiple services including, but not limited to, a predictive energy expenditure service, a configurable data logging service for both normal and abnormal operational situations, as well as an adverse situation monitoring and mitigation service.

Embodiments of the present disclosure feature an onboard VEM system associated with a vehicle that is in constant communication with the RVOH. In some embodiments, the onboard VEM system embodies and/or integrates with an application instance configured to integrate with one or more vehicle systems and/or apparatuses associated with a vehicle managed by the VEM platform. As such, one or more onboard VEM systems associated with one or more vehicles can enable the RVOH to function as a centralized system for facilitating the management of the one or more vehicles. In various embodiments, the onboard VEM system can integrate with, or be embodied by, a computing device such as a line replaceable unit (LRU) associated with a vehicle.

In various embodiments, the onboard VEM system associated with a respective vehicle (e.g., an electric aerial vehicle or an electric ground vehicle) can transmit one or more portions of data to the RVOH via a communications network. For example, the onboard VEM system can be configured to transmit one or more portions of data related to a current energy expenditure of the vehicle, one or more current values associated with one or more respective battery parameters associated with a battery system of the vehicle, data related to an adverse situation, and/or the like. In this regard, in various embodiments, the RVOH apparatus of the RVOH can be configured to execute one or more operations associated with the onboard VEM system. For example, in various contexts such as, for example, when an electric vehicle such as an electric aerial vehicle or an electric ground vehicle is completely autonomous, the RVOH apparatus can be configured to perform at least a portion of the processing associated with the onboard VEM system associated with the electric vehicle. As such, the computational resources needed by the electronic aerial vehicle may be advantageously reduced. It should be appreciated that in some embodiments, the functionality of the RVOH is instead provided via the onboard VEM system for a particular vehicle.

The RVOH apparatus associated with the RVOH is also configured to generate, based on the output of an associated vehicle performance prediction model, a predicted energy visualization. In various contexts, the predicted energy visualization corresponds to a predicted energy expenditure of the vehicle for one or more defined travel legs between a plurality of flight phases and/or waypoints associated with a trip route of a trip plan associated with the vehicle. In various examples, the predicted energy visualization is displayed on a situation interface in relation to the one or more defined travel legs between a plurality of flight phases and/or waypoints associated with the trip route. Furthermore, the predicted energy visualization is configured to be plotted along at least one axis of the situation interface representing a position of the vehicle along the trip route. For example, the general shape of the predicted energy visualization corresponds to the predicted energy expenditure of the vehicle at certain points along the trip route (e.g., certain flight phases, waypoints, etc.) that have been plotted along at least one axis of the situation interface. This offers the benefit of being able to quickly interpret the project SoF of the battery system of the vehicle at various points along the trip route.

In various examples, the vehicle performance prediction model can update the predicted energy expenditure of the vehicle based on updated vehicle operation data collected in real-time. The updated vehicle operation data may comprise at least one portion of data associated with one or more factors affecting a current energy expenditure of the vehicle. For example, the updated vehicle operation data may comprise at least one of a current load on the vehicle battery system, the current energy expenditure, a current elevation of the vehicle, one or more upcoming flight phases, one or more current environmental factors, a current battery SoF, or a current operational health of one or more vehicle systems. As such, the RVOH apparatus is configured to display an updated predicted energy visualization based on the updated predicted energy expenditure on the situation interface.

The predicted energy visualization can be displayed via an electronic display associated with one or more respective computing devices onboard or off of an associated vehicle (e.g., a primary flight display of a vehicle, an electronic display associated with the RVOH apparatus, etc.). Furthermore, the predicted energy visualization is characterized by at least one of a color-code, a shading scheme, a pattern, a transparency, a gradient, and/or a shape that is determined based on one or more predicted values associated with one or more battery parameters associated with a battery system (e.g., a current SoF, state of charge (SoC), and/or state of health (SoH)) of the vehicle. The one or more battery parameters may be related to the predicted energy expenditure of the vehicle based at least in part on the trip plan being executed by the vehicle and/or a remaining distance to cover between a current location of the vehicle and a final destination associated with the trip plan. In various embodiments, the color-code, shading scheme, pattern, transparency, gradient, and/or a shape associated with the predicted energy visualization may be configured based on one or more system configuration preferences defined for a particular VEM platform (e.g., defined via the RVOH apparatus).

In a first non-limiting example scenario, if a vehicle performance prediction model associated with the RVOH predicts that a vehicle (e.g., an aerial vehicle) will have a certain energy level (e.g., a certain SoC associated with the battery system) when arriving at a final destination (e.g., a predicted energy level corresponding to 30% of an available energy capacity of the battery system) and the predicted energy level associated with the final destination is above a predefined energy reserve requirement (e.g., an energy reserve requirement of 15%), the predicted energy visualization associated with one or more travel legs to be covered enroute to the final destination may be colored white.

However, in a second non-limiting example scenario, if, due to an adverse situation (e.g., related to a battery malfunction and/or suboptimal environmental factors), the battery discharge is faster than usual and the vehicle performance prediction model determines that the vehicle (e.g., the aerial vehicle) will not reach the final destination with an energy level that was originally predicted (e.g., a predicted energy level corresponding to 30% of an available energy capacity of the battery system), the vehicle performance prediction model may determine at which point during the trip plan the predicted energy expenditure of the vehicle will reach and/or fall below a predefined energy reserve requirement associated with the vehicle (e.g., an energy reserve requirement of 15%). In this regard, the vehicle performance prediction model may determine that the predicted energy expenditure may satisfy (e.g., meet, exceed, and/or fall short of) one or more energy level thresholds. For example, the one or more energy thresholds may be associated with a determined battery parameter value (e.g., an SoC of 35% of the capacity of the battery system), and/or with a determined energy reserve requirement (e.g., an energy reserve requirement of 15%).

As such, if it is determined that the predicted energy expenditure may satisfy (e.g., meet, exceed, and/or fall short of) one or more energy level thresholds, the predicted energy visualization associated with one or more travel legs yet to be covered by the vehicle may be shown in various colors corresponding to the one or more energy level thresholds. For example, if the predicted energy expenditure falls below a first energy level threshold (e.g., an SoC of 35%) the predicted energy visualization may be shown in yellow until the predicted energy expenditure of the vehicle reaches a point (e.g., a respective flight phase and/or waypoint) in the trip plan associated with an energy reserves threshold associated with the predefined energy reserve requirement (e.g., the energy reserve requirement of 15%). The predicted energy visualization associated with any travel legs, flight phases, and/or waypoints associated with a predicted energy expenditure falling below the predefined energy reserve requirement (e.g., the energy reserve requirement of 15%) may be colored red.

Additionally or alternatively, the vehicle performance prediction model, in conjunction with the RVOH apparatus, is configured to generate one or more vertical indicators to be rendered on the situation interface in relation to the trip route plotted along the at least one axis of the situation interface. In some examples, the one or more vertical indicators may be associated with the particular point along the trip route for which the predicted energy expenditure of the vehicle is projected to reach the one or more energy level thresholds. Additionally or alternatively, in various examples, the one or more vertical indicators rendered on the situation interface may be associated with a plurality of recommendations generated by the vehicle performance prediction model to mitigate one or more adverse situations impacting the operation of the vehicle. It will be appreciated that a vertical interface may similarly be arranged as a horizontal interface in some embodiments, for example where the data represented by the axes of the interface are flipped. In this regard, a situation interface may in some embodiments may similarly be configured as a horizontal interface.

In various contexts, a performance prediction system comprising the vehicle performance prediction model may determine, as part of a pre-trip validation process, the predicted energy expenditure of a vehicle based on a vehicle profile, a trip plan associated with the vehicle, and/or one or more environmental factors. The vehicle profile may comprise data related to at least one of a vehicle type, a vehicle identifier, a vehicle battery system configuration, a number of passengers, and/or a vehicle payload weight. In some examples, the performance prediction system is configured to determine whether a particular trip plan is feasible (e.g., is safely performable within current battery conditions, predicted operational effects, and/or the like). In various contexts, determining whether the particular trip plan is feasible comprises correlating the particular trip plan and/or the results from the pre-trip validation process with one or more current values associated with one or more battery parameters associated with the battery system of the vehicle (e.g., a current SoF, SoH, and/or SoC).

Additionally or alternatively, the performance prediction system may determine whether the particular trip plan is feasible based in part on a predefined energy reserve requirement associated with the vehicle. For example, in various contexts, one or more vehicles associated with a respective VEM platform may be configured to adhere to a predefined energy reserve requirement (e.g., an energy reserve requirement of 15%) regulating that a battery system of a respective vehicle must have a required amount of energy reserves relative to an available energy capacity of the battery system after arriving at a final destination associated with the particular trip plan.

In various embodiments, the performance prediction system associated with the RVOH comprises, in addition to the vehicle performance prediction model, a vehicle performance model configured to determine and/or mitigate one or more adverse situations impacting the operation of the vehicle. The performance prediction system, in some contexts, is configured to continually receive one or more portions of vehicle operation data, vehicle sensor data, vehicle system data, air traffic data, environmental data, logistical data, personnel data, and/or any other relevant data related to a particular vehicle. Such data in some contexts is generated, measured, calculated, and/or otherwise obtained from the one or more computing devices comprised in both a vehicle and/or the RVOH and configured as model input for the vehicle performance model.

The vehicle performance model of the performance prediction system can determine based on the model input that one or more adverse situations are occurring that may impact the operation of the vehicle such as, for example, that one or more battery cells of the battery system of the vehicle are discharging at an unexpected rate. In some examples, the vehicle performance model can determine that one or more adverse situations are occurring based on updated predicted energy expenditure data generated by the vehicle performance prediction model. As such, the RVOH apparatus, in conjunction with the performance prediction system, can cause display, via a remote vehicle operation interface, a plurality of recommendations for mitigating the adverse situation. Furthermore, the RVOH apparatus, in conjunction with the performance prediction system, can cause display, upon selection of a first recommendation of the plurality of recommendations, an alternate predicted energy visualization associated with an alternate predicted energy expenditure based on a respective alternate trip plan on the situation interface. In such examples, the alternate predicted energy visualization can be displayed via the situation interface in relation to at least one defined leg between a plurality of flight phases associated with the alternate trip plan.

In various embodiments, the vehicle performance prediction model is configured to generate the plurality of recommendations for mitigating the one or more adverse situations based in part on one or more rules in response to receiving model output (e.g., vehicle performance data) generated by the vehicle performance model. In some examples, the plurality of recommendations is associated with a respective criticality and/or severity related to the adverse situation. Furthermore, the vehicle performance prediction model in some contexts is configured to execute, or cause execution, of at least one recommendation of the plurality of recommendations based on the one or more rules. For example, in one or more embodiments, the vehicle performance prediction model can direct the vehicle apparatus to execute a recommendation of the plurality of recommendations by operating, updating configurations for, and/or otherwise controlling one or more respective vehicle systems associated with a vehicle.

Embodiments of the present disclosure enable an operator of the vehicle to reduce the time required to accurately perform an analysis of the current SoH, SoC, and/or SoF associated with a battery system of a vehicle, generate potential solutions based at least in part on the analysis, and ultimately decide upon an optimal solution. By enabling quicker action, such embodiments thus reduce the likelihood of errors, unsafe scenarios, and/or other disastrous circumstances arising from incorrect decisions made by an operator and/or delayed decision-making by the operator due to circumstances associated with the one or more adverse situations impacting the operation of the vehicle. Furthermore, the VEM platform can support one or more operators that may lack the knowledge and/or experience with which to timely mitigate the one or more adverse situations in order to ensure the safety, efficiency, and optimal operation of the vehicle, the vehicle crew, and/or the passengers of the vehicle.

Additionally or alternatively, embodiments of the present disclosure provide for a myriad of user interface improvements. Embodiments of the present disclosure arrange user interface components in a particular manner that is tied to the real-time determined or predicted circumstances of operation of the vehicle, for example. In this regard, the user interfaces depicted and described herein are non-arbitrarily arranged to provide such technical advantages in addition to the aforementioned advantages to vehicle operators.

It will be appreciated that embodiments of the present disclosure may be advantageous for a myriad of vehicle types. In this regard, aerial vehicles are utilized as an exemplary type of vehicle for purposes of simplifying the disclosure. The description specific to aerial vehicles should not limit the scope and spirit of the disclosure unless otherwise explicitly stated. For example, the methods described herein may be applicable to the fields of autonomous automobile operation, autonomous watercraft operation, and/or the like.

Definitions

"Vehicle energy monitoring (VEM) platform" refers to a distributed vehicle monitoring platform configured to monitor the operation of one or more vehicles to identify and mitigate one or more adverse situations that can impact the operation of the one or more vehicles. For example, components of the VEM platform are configured to facilitate the execution of one or more trip plans associated with the one or more vehicles by employing a vehicle performance prediction model to predict the energy expenditure of the one or more vehicles. Furthermore, the components of the VEM platform are configured to detect whether one or more adverse situations are impacting a respective vehicle based at least in part on a comparison of the predicted energy expenditure of the vehicle and a current energy expenditure of the vehicle.

A VEM platform in some contexts is associated with one or more enterprises such as, for example, a logistics enterprise, a delivery and shipment enterprise, a commercial airline, an aerial delivery enterprise, an urban air mobility (UAM) enterprise, an advanced air mobility (AAM) enterprise, a military enterprise, and/or the like that manages and/or deploys a fleet of vehicles. The VEM platform in some contexts includes and/or integrates with one or more systems, computing devices, services, and/or datastores. For example, the VEM platform can interface with one or more vehicle operation management systems, environment data systems, air traffic control systems, urban air mobility (UAM) systems, and/or the like.

In various embodiments, the VEM platform comprises a remote vehicle operation hub (RVOH) configured for the offboard management and control of a fleet of vehicles associated with an enterprise. In this regard, the VEM platform is configured as a distributed management system such that one or more vehicles integrate with a respective onboard VEM system communicably coupled to the RVOH. The RVOH, in conjunction with a particular instance of the onboard VEM system associated with a particular vehicle, is configured to monitor, manage, and/or improve the performance of the particular vehicle by providing enhanced VEM to one or more operators associated with the particular vehicle. The RVOH and one or more onboard VEM systems associated with one or more respective vehicles remain in constant contact and are configured to transmit and/or receive data related to the operation of the one or more vehicles via a communications network. The RVOH comprises one or more computing devices, one or more machine learning (ML) models, and/or one or more datastores configured to monitor and/or manage one or more vehicles.

"Onboard VEM system" refers to hardware, software, firmware, and/or a combination thereof, that embodies and/or maintains an application instance configured to integrate with one or more vehicle systems and/or apparatuses associated with a vehicle managed by the VEM platform. The onboard VEM system comprises, and/or integrates with, among other components, an energy monitoring system, an onboard VEM datastore, and/or one or more electronic displays configured to monitor the energy expenditure of a vehicle. The onboard VEM system, in some contexts, integrates with, or can be embodied by, a computing device such as a line replaceable unit (LRU). For example, the onboard VEM system in some contexts is embodied by an aerospace gateway LRU configured to communicate with one or more vehicle systems. The RVOH and one or more onboard VEM systems associated with one or more respective vehicles remain in constant communication and are configured to transmit and/or receive data related to the operation of the one or more vehicles via a communications network.

In this regard, the onboard VEM system is configured to log and/or transmit one or more portions of data related to the vehicle to the RVOH. For example, the onboard VEM system is configured to transmit one or more portions of data related to the real-time performance of a respective vehicle to the RVOH. Additionally or alternatively, the onboard VEM system is configured to receive one or more portions of data related to a predicted energy expenditure of the vehicle based at least in part on a trip plan associated with the vehicle.

In various contexts, the onboard VEM system is configured to transmit one or more current values associated with one or more battery parameters associated with the battery system of a vehicle (e.g., the current SoF, SoC, SoH, and/or temperature), the current operational health of the one or more vehicle systems associated with the vehicle, and/or any other relevant vehicle operation data related to the energy consumption of the vehicle. In various embodiments, the onboard VEM system associated with a respective vehicle (e.g., an electric aerial vehicle or electric ground vehicle) can transmit the one or more portions of data to the RVOH via a communications network. For example, the onboard VEM system can be configured to transmit one or more portions of data related to a current energy expenditure of the vehicle, one or more current values associated with one or more respective battery parameters associated with a battery system of the vehicle, data related to an adverse situation, and/or the like.

"Battery parameters" refer to one or more measurable parameters associated with a battery system of a respective vehicle. Battery parameters may include, but are not limited to, a state of charge (SoC), a state of health (SoH), a state of function (SoF), and/or a temperature associated with the battery system of the vehicle. The SoC is related to how much charge is left in a battery cell at a given time. The SoH is related to the ability of a respective battery cell to retain a charge (e.g., as compared to the initial ability of the battery cell when manufactured). The SoF is related a readiness of a respective battery cell in terms of usable energy derived by, for example, determining a current SoC of a battery cell in relation to the overall available capacity of the battery cell. In various contexts, the SoC, SoH, and/or SoF are determined by the vehicle performance model of a performance prediction system in conjunction with an energy monitoring system of a respective vehicle.

"Adverse situation" refers to a data-driven determination or characteristic of an effect or operational state of a vehicle or subsystem thereof. For instance, an adverse situation in some contexts is an emergency situation impacting the operation of the vehicle and/or one or more persons associated with the vehicle. An adverse situation in some contexts can also be a circumstance affecting the optimization of one or more vehicle systems associated with the vehicle, such as a battery system. A few non-limiting examples of adverse situation types that in some contexts are associated with a respective adverse situation include, an emergency situation type, a hazard situation type, a mechanical failure situation type, a logistical situation type, an environmental situation type, an optimization situation type, a personnel health situation type, and/or the like. Determination of an adverse situation in some contexts is based in part on one or more portions of vehicle performance data. The vehicle performance model associated with a performance prediction system of an RVOH is configured to identify, classify, categorize, and/or analyze one or more adverse situations impacting the operation of a vehicle.

"Vehicle operation data" refers to data that indicates at least one aspect of an operational state of a vehicle or a particular subsystem thereof. Vehicle operation data comprise data collected, measured, obtained, generated, and/or otherwise processed by the one or more vehicle systems associated with the vehicle. In various embodiments, one or more portions of vehicle operation data, in some contexts, is received from the RVOH via a communications network. In various embodiments, at least a portion of the vehicle operation data is based at least in part on vehicle sensor data collected, measured, calculated, and/or otherwise generated by one or more sensors associated with the vehicle. Additionally or alternatively, in various contexts, vehicle operation data can include at least one data value indicating whether a vehicle is operating in a nominal scenario, data indicative of an emergency scenario, data indicative of a hazard scenario, data indicative of a logistical scenario that alters the voyage of the vehicle, and/or data indicative of a change in the operation of a system affecting control of the vehicle. Additionally or alternatively, vehicle operation data may be related to a current load on the vehicle battery system, a current energy expenditure, a current elevation of the vehicle, one or more upcoming flight phases, one or more current environmental factors, a current battery SoF, SoC, and/or SoH, and/or a current operational health of one or more vehicle systems related to the vehicle.

"Vehicle sensor data" refers to electronically managed data utilized by a vehicle for operation that is captured by at least one sensor onboard or otherwise communicable with the vehicle. Vehicle sensor data in some contexts is any data collected, measured, calculated, and/or otherwise generated by one or more sensors associated with the vehicle.

"Performance prediction system" refers to hardware, software, firmware, and/or a combination thereof associated with an onboard VEM system that is configured to monitor the energy expenditure of a vehicle (e.g., an electric aerial vehicle or an electric ground vehicle), predict the future energy expenditure of the vehicle based at least in part on a trip plan being executed by the vehicle, and/or detect and/or mitigate one or more adverse situations impacting the operation of the vehicle. The performance prediction system is also configured to generate, based on the output of an associated vehicle performance prediction model, an energy visualization representing the predicted energy expenditure of the respective vehicle. In various contexts, the predicted energy visualization corresponds to a predicted energy expenditure of the vehicle for one or more defined travel legs between two or more flight phases and/or waypoints associated with a trip plan associated with the vehicle. The predicted energy visualization is configured to display over a respective electronic display associated with one or more computing devices depicting an environment of the vehicle.

In various contexts, the predicted energy visualization is configured to be displayed on a situation interface the trip plan being executed such that a predicted energy expenditure of a vehicle for one or more defined travel legs between two or more flight phases and/or waypoints associated with the trip plan can be visualized relative to a current position of the vehicle. For example, the predicted energy visualization can be configured to be displayed on a situation interface in relation to the one or more defined travel legs between a plurality of flight phases and/or waypoints associated with the trip route. Furthermore, the predicted energy visualization is configured to be plotted along at least one axis of the situation interface representing a position of the vehicle along the trip route. For example, the general shape of the predicted energy visualization corresponds to the predicted energy expenditure of the vehicle at certain points along the trip route (e.g., certain flight phases, waypoints, etc.) that have been plotted along at least one axis of the situation interface.

In some examples, the situation interface is a sub-interface of a remote vehicle operation interface associated with one or more computing devices associated with the RVOH. In various other examples, the situation interface is a vertical situation interface. In other examples, the situation interface is associated with a vertical situation display (VSD) associated with a vehicle (e.g., an aerial vehicle).

The predicted energy visualization in some embodiments is displayed via an electronic display associated with one or more respective computing devices (e.g., a primary flight display of an aerial vehicle, an electronic display associated with the RVOH apparatus, etc.). Furthermore, the predicted energy visualization is characterized by at least one of a color-code, a shading scheme, a pattern, a transparency, a gradient, and/or a shape that is determined based on one or more predicted values associated with one or more battery parameters associated with a battery system (e.g., a current SoF, SoC, and/or SoH) of the vehicle. The one or more battery parameters may be related to the predicted energy expenditure of the vehicle based at least in part on the trip plan being executed by the vehicle and/or a remaining distance to cover between a current location of the vehicle and a final destination associated with the trip plan. In various embodiments, the color-code, shading scheme, pattern, transparency, gradient, and/or a shape associated with the predicted energy visualization may be configured based on one or more system configuration preferences defined for a particular VEM platform (e.g., defined via the RVOH apparatus).

Furthermore, in various contexts, the performance prediction system is configured to determine that a current energy expenditure of the vehicle does not match a predicted energy expenditure associated with particular trip plan being executed by the vehicle. The performance prediction system comprises one or more statistical, algorithmic, and/or ML models associated with the onboard VEM system. In some contexts, the performance prediction system comprises one or more math models, rule expression models and/or specialized deep learning neural networks. In various other contexts, the performance prediction system comprises a time series data analysis model. In one or more embodiments, the performance prediction system comprises a vehicle performance prediction model and/or a vehicle performance model.

In various contexts, the performance prediction system is configured to determine, based at least in part on a comparison of one or more current values associated with one or more battery parameters associated with the battery system of a vehicle (e.g., the current SoF, SoC, SoH, and/or temperature), the current operational health of the one or more vehicle systems associated with the vehicle, and/or the predicted energy expenditure of the vehicle, whether an adverse situation is detected during execution of a particular trip plan. For example, depending on the context, if the performance prediction system determines that an adverse situation is detected, the performance prediction system can generate a recommendation for the vehicle to enter an alternate, energy-conserving operational mode, divert to a candidate travel hub, and/or perform an emergency landing. Furthermore, the performance prediction system can automatically determine an optimal route to an optimal travel hub for the vehicle to navigate to, where determining the optimal travel hub comprises ranking one or more candidate travel hubs based on at least one of a distance between a respective candidate travel hub of the one or more candidate travel hubs and the vehicle, or the predicted energy expenditure of the vehicle.

In various contexts, the performance prediction system causes display of one or more candidate travel hubs and/or an optimal travel hub for selection via one or more computing devices associated with the VEM platform (e.g., the vehicle apparatus and/or the RVOH apparatus). Furthermore, the performance prediction system can cause the vehicle to navigate to a candidate travel hub of the one or more candidate travel hubs or the optimal travel hub based on the selection. Additionally or alternatively, in various contexts, the performance prediction system can be configured to automatically select the candidate travel hub or the optimal travel hub. In such contexts, the performance prediction system can be configured to cause the vehicle to navigate to the candidate travel hub or the optimal travel hub based on the automatic selection of the candidate travel hub or the optimal travel hub by the performance prediction system.

"Vehicle performance model" refers to an ML model associated with a performance prediction system of an RVOH and is specially configured to receive one or more portions of vehicle operation data. Based at least in part on the one or more portions of vehicle operation data, the vehicle performance model can generate one or more portions of vehicle performance data describing one or more operational states of the vehicle. Additionally, the vehicle performance model is configured to identify, classify, categorize, and/or analyze one or more adverse situations impacting the operation of a vehicle.

The vehicle performance model in some contexts generates one or more portions of vehicle performance data as model output configured to describe the current status, energy expenditure, operational parameters, data values, operational modes, and/or configurations of one or more vehicle systems associated with the vehicle. In this regard, if the vehicle performance model determines that one or more adverse situations are taking place that are impacting the operation of the vehicle, the vehicle performance model determines how the one or more adverse situations are impacting the respective vehicle systems. The one or more portions of vehicle performance data are one or more portions of data that have been configured for logging, analysis, ML model input, ML model training, and/or storage. In various contexts, one or more portions of vehicle performance data can be stored, accessed, retrieved, and/or otherwise managed by a datastore associated with the VEM platform.

"Vehicle performance prediction model" refers to an ML model associated with the performance prediction system of an RVOH. In various contexts, the vehicle performance prediction model is configured as a deep learning neural network such as an artificial neural network, (ANN), recurrent neural network (RNN), convolutional neural network (CNN), and/or any other specialized deep learning neural network. In various contexts, the vehicle performance prediction model is configured predict an energy expenditure associated with a respective vehicle. The performance prediction system is also configured to generate an energy visualization representing the predicted energy expenditure of the respective vehicle. In various contexts, the predicted energy visualization corresponds to one or more defined travel legs between two or more flight phases and/or waypoints associated with a trip plan associated with the vehicle. The predicted energy visualization is configured to display over a respective electronic display associated with one or more computing devices depicting an environment of the vehicle.

The vehicle performance prediction model is also configured to determine, generate, and/or suggest one or more recommendations for mitigating one or more adverse situations based in part on one or more rules in response to receiving model output (e.g., vehicle performance data) generated by the vehicle performance model. In some examples, the plurality of recommendations is associated with a respective criticality and/or severity related to the adverse situation. Furthermore, the vehicle performance prediction model in some contexts is configured to execute, or cause execution, of at least one recommendation of the plurality of recommendations based on the one or more rules. For example, in one or more embodiments, the vehicle performance prediction model can direct the vehicle apparatus to execute a recommendation of the plurality of recommendations by operating, updating configurations for, and/or otherwise controlling one or more respective vehicle systems associated with a vehicle.

Additionally, the vehicle performance prediction model in some contexts determines which recommendations of a set recommendations will have the greatest positive effect on the current situation associated with a vehicle being impacted by one or more adverse situations. For example, in some embodiments, the vehicle performance prediction model ranks one or more recommendations of the set of recommendations based at least in part on a predicted result associated with the execution of the one or more recommendations. For instance, a first recommendation in some contexts is ranked higher relative to a second recommendation based at least in part on a predicted result associated with the first recommendation. Based on the ranking of the one or more recommendations, the vehicle performance prediction model may give a particular recommendation priority by highlighting, pre-selecting, and/or otherwise calling attention to the particular recommendation on a remote vehicle operation interface associated with one or more computing devices associated with the RVOH.

A vehicle performance prediction model, in some contexts, is iteratively retrained and/or otherwise updated based on data related to one or more vehicles associated with the VEM platform. For example, the vehicle performance prediction model in some contexts is trained and/or retrained based in part on one or more portions of vehicle performance data related to one or more vehicles associated with one or more respective enterprises related to the VEM platform. Additionally or alternatively, the vehicle performance prediction model, in some contexts, is also trained and/or retrained based in part on one or more portions of adverse situation data. The adverse situation data comprises but is not limited to data related to one or more adverse situations that adversely impacted one or more vehicle systems of a particular vehicle and/or data related to one or more respective rules and/or recommendations with which the onboard VEM system employed to mitigate the one or more adverse situations.

"Recommendation" refers to electronically managed data representing one or more suggested actionable measures that in some contexts is executed to address one or more adverse situations impacting the operation of a vehicle. In some embodiments, a recommendation embodies model output generated by the vehicle performance prediction model. Recommendations in some contexts are configured to be human-readable and are rendered via a respective electronic interface associated with one or more computing devices such as, for example a vehicle apparatus associated with the vehicle and/or an RVOH apparatus associated with the RVOH.

In various contexts, a recommendation is associated with one or more of one or more candidate travel hubs and/or an optimal travel hub determined by the performance prediction system. For example, in various contexts, a particular recommendation may be a recommendation to navigate the vehicle to the nearest candidate travel hub in response to determining that an adverse situation is impacting the operation of the vehicle (e.g., a failure of a particular vehicle system, abnormal battery discharge, and/or the like). As another non-limiting example, a particular recommendation may be a recommendation to switch the vehicle into an alternate, energy-conserving operational mode in response to determining that the batteries associated with the vehicle are discharging at an unexpectedly fast rate. As another non-limiting example, a particular recommendation may be a recommendation to generate, request, and/or receive an alternative trip plan if a first trip plan is determined to be infeasible based at least in part on a predicted energy expenditure of the vehicle related to the first trip plan.

In various embodiments, recommendations are executed automatically by the performance prediction system. In various other embodiments, the recommendations in some contexts are confirmed by an operator of the vehicle, where confirmation is a selection indication associated with the recommendations generated via one or more computing devices and where the confirmation causes execution of the recommendations. Executing a recommendation comprises operating one or more systems associated with the vehicle to control the operation of the vehicle. In some embodiments, the execution of a recommendation must be confirmed via a computing device (e.g., a vehicle apparatus or an RVOH apparatus). In various other embodiments, recommendations in some contexts are automatically executed depending on the criticality of the corresponding adverse situation impacting the operation of the vehicle.

"Rule" refers to electronically managed data and/or computer code instructions representing an operational constraint, limit, parameter threshold, guideline, and/or the like that in some contexts is defined to govern one or more operations, systems, components, and/or environments associated with a particular vehicle. In various embodiments, rules in some contexts are related to a specific domain of applicable knowledge (e.g., the aerospace domain). Based in part on one or more rules associated with the particular vehicle, the vehicle performance prediction model, in conjunction with the vehicle performance model, can determine whether one or more rules have been violated or satisfied by one or more vehicle systems and/or an environment associated with the vehicle.

In various embodiments, a rule defines a threshold data value and/or data range which in some contexts is used to determine whether a particular rule has been violated, satisfied, exceeded, and/or otherwise triggered. As a non-limiting example, a rule defines a threshold (e.g., a particular data value and/or data range) for a nominal battery discharge rate. If the onboard VEM system determines via the energy monitoring system that the vehicle has exceeded the threshold associated with the nominal battery discharge rate (and therefore violated the corresponding rule), the performance prediction system can execute one or more recommendations associated with the rule that was violated. For example, the performance prediction system can cause execution of one or more recommendations to correct an abnormal battery discharge rate by reconfiguring one or more operational parameters associated with the one or more engine components (e.g., by causing the vehicle apparatus to switch the vehicle into an alternate, energy-conserving operational mode).

"Trip plan" refers to one or more portions of data representing at least one or more flight phases, destinations, waypoints, flight paths, arrival/departure schedules and/or procedures, routes, missions, traffic management constraints, trip parameters, and/or the like that have been determined for a particular vehicle (e.g., a particular electric aerial vehicle). In some examples and with regard to a particular electric aerial vehicle, a trip plan may be referred to as a flight plan or mission plan. As such, the terms, trip plan, flight plan, and mission plan are used interchangeably throughout. Based on the data associated with a trip plan, performance prediction system associated with a respective RVOH can determine whether the trip plan is feasible based upon a predicted energy expenditure generated based at least in part on one or more current values associated with the one or more battery parameters associated with a battery system of the respective vehicle and/or one or more trip parameters associated with the vehicle.

"Flight phases" refer to any number of particular phases of a flight of a respective trip plan being executed by an aerial vehicle and/or data associated with any of such phases. Non-limiting examples of flight phases include takeoff, top of climb (TOC), enroute, cruise, approach, top of descent (TOD), landing, and/or taxi. Representations of one or more flight phases associated with a particular trip plan may be displayed on a situation interface depicting an environment of a vehicle. One or more travel legs associated with a trip plan may use one or more flight phases as a waypoint and/or point of reference associated with the trip plan. As such, the current location of the vehicle can be determined and/or displayed relative to one or more upcoming flight phases of a trip route rendered on a vertical situation display. One or more flight phases may be associated with a determined load on a battery system associated with a vehicle and, as such, may be used by a vehicle performance prediction model to generate a predicted energy expenditure of a respective vehicle.

"Travel hub" refers to an environment, space, or other physical location that is configured and/or otherwise arranged to serve inbounding and/or outbounding of one or more vehicles. Non-limiting examples of travel hubs include airports, vertiports, helipads, hangars, vehicle fueling stations, vehicle pools, service stations, vehicle maintenance facilities, vehicle manufacturing facilities, vehicle sales facilities, and/or the like. A travel hub may embody, integrate with, and/or host one or more charging facilities such that one or more electric vehicles may charge one or more batteries associated with the battery system of the one or more respective electric vehicles at the travel hub.

The term "vehicle" refers to any machine, apparatus, robot, or other mechanism that facilitates movement from a first location to a second location via any medium. A vehicle may traverse itself, move people, move goods, and/or otherwise traverse any of myriad of things. A vehicle in various contexts traverses through a medium of air, on land, and/or by sea. "Aerial vehicle" refers to any manned or unmanned vehicle capable of air travel. Non-limiting examples of an aerial vehicle include a passenger airplane, a helicopter, an unmanned aerial vehicle, an electric aerial vehicle, an electronic vertical takeoff or landing (eVTOL) aircraft, a jet, a drone, or a quadcopter. At least some aerial vehicles are controllable by systems onboard the aerial vehicle. At least some aerial vehicles are controllable by systems external from the aerial vehicle including, and without limitation, remote control systems, ground systems, and centralized control systems. In various embodiments, an aerial vehicle can be an electric aerial vehicle that is powered partially or completely by a battery system integrated with the electric aerial vehicle.

"Computing device" refers to any computer, processor, circuitry, and/or other executor of computer instructions that is embodied in hardware, software, firmware, and/or any combination thereof. Non-limiting examples of a computing device include a computer, a processor, an application-specific integrated circuit, a field-programmable gate array, a personal computer, a smart phone, a laptop, a fixed terminal, a server, a networking device, and a virtual machine.

"User computing device" refers to a computing device associated with a person, company, or other organizational structure that controls one or more systems. In some embodiments, a user computing device is associated with particular administrative credentials that define access to operation via a particular system.

"Executable code" refers to a portion of computer program code stored in one or a plurality of locations that is executed and/or executable via one or more computing devices embodied in hardware, software, firmware, and/or any combination thereof. Executable code defines at least one particular operation to be executed by one or more computing devices. In some embodiments, a memory, storage, and/or other computing device includes and/or otherwise is structured to define any amount of executable code (e.g., a portion of executable code associated with a first operation and a portion of executable code associated with a second operation). Additionally or alternatively, in some embodiments, executable code is embodied by separate computing devices (e.g., a first datastore embodying first portion of executable code and a second datastore embodying a second portion executable code).

"Datastore," "database," and "data lake" refer to any type of non-transitory computer-readable storage medium. Non-limiting examples of a datastore, database, and/or data lake include hardware, software, firmware, and/or a combination thereof capable of storing, recording, updating, retrieving and/or deleting computer-readable data and information. In various embodiments, a datastore, database, and/or data lake in some contexts is a cloud-based storage system accessible via a communications network by one or more components of the various embodiments of the present disclosure.

"Data attribute" refers to electronically managed data representing a variable or particular criteria or property having a particular value or status. In some contexts the value is statically fixed or dynamically assigned. In some embodiments, a data attribute embodies a particular property of a data object.

"Data value" refers to electronically managed data representing a particular value for a particular data attribute, operational parameter, sensor device, and/or the like.

The phrases "in an embodiment," "in one embodiment," "according to one embodiment," and the like generally mean that the particular feature, structure, or characteristic following the phrase in some contexts is included in at least one embodiment of the present disclosure, and in some contexts is included in more than one embodiment of the present disclosure (importantly, such phrases do not necessarily refer to the same embodiment). The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature in some contexts is optionally included in some embodiments, or it in some contexts is excluded.

As used herein, the terms "data," "content," "digital content," "data object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Example Systems, Apparatuses, and Dataflows of the Disclosure

FIG. 1 illustrates an example system that enables enhanced vehicle energy monitoring (VEM) in accordance with at least some example embodiments of the present disclosure. Specifically, FIG. 1 depicts an example system 100 within which embodiments of the present disclosure may operate to provide enhanced VEM for a vehicle 112. As depicted, the system 100 includes vehicle onboard systems 102 associated with the vehicle 112. Additionally or alternatively, in some embodiments, the vehicle 112 is communicable (e.g., via the vehicle onboard systems 102) with one or more external computing devices and/or systems. For example, in some embodiments, the vehicle onboard systems 102 is optionally communicable with some or all of the other connected vehicle systems 104, vehicle operation management systems 106, and/or environment data systems 108. In some such embodiments, the vehicle onboard systems 102 communicates with the other connected vehicle systems 104, vehicle operation management systems 106, and/or environment data systems 108 via one or more specially configured communications networks, for example the network 110.

In some embodiments, the vehicle onboard systems 102 includes any number of computing devices and/or systems embodied in hardware, software, firmware, and/or a combination thereof, that control, operate, and/or otherwise function onboard a vehicle 112. For example, in some embodiments, the vehicle onboard systems 102 includes one or more physical components of the vehicle 112, including and without limitation one or more displays, flight management systems, vehicle operation management systems, engines, wings, props, motors, antennas, landing gear, and/or the like. In some embodiments, the vehicle onboard systems 102 includes one or more sensors that gather, collect, and/or otherwise aggregates sensor data relevant to operation of the vehicle 112, associated with the vehicle 112, and/or otherwise associated with an environment of the vehicle 112.

Additionally or alternatively, in some embodiments, the vehicle onboard systems 102 includes one or more computing devices and/or systems embodied in hardware, software, firmware, and/or a combination thereof, that controls operation of one or more physical components of the vehicle 112. For example and without limitation, in some embodiments the vehicle onboard systems 102 includes computing devices and/or systems that control one or more displays, flight management systems, vehicle operation management systems, engines, wings, props, motors, antennas, landing gears, sensors, and/or the like.

Additionally or alternatively, in some embodiments, the vehicle onboard systems 102 includes one or more computing devices and/or systems embodied in hardware, software, firmware, and/or a combination thereof, that generates and/or otherwise causes rendering of one or more user interfaces renderable to one or more displays onboard and/or otherwise associated with the vehicle 112. In some embodiments such computing devices and/or systems specially configure some or all elements of user interfaces to be rendered based at least in part on received data. It should be appreciated that the vehicle onboard systems 102 in some embodiments includes any of a myriad of specially configured computing devices and/or systems that enable the vehicle 112 to operate in a particular manner of airborne travel. For example, in various embodiments, the vehicle onboard systems 102 may include a primary flight display (PFD), an electronic flight bag (EFB), a flight management system (FMS), a gateway computing device, and/or the like. In various embodiments, the vehicle onboard systems 102 associated with a respective vehicle may be configured in a line replaceable unit (LRU).

In some embodiments, the vehicle onboard systems 102 includes one or more personal computers, end-user terminals, monitors, or other displays, and/or the like. Additionally or alternatively, in some embodiments, the vehicle onboard systems 102 includes one or more data repository/data repositories embodied in hardware, software, firmware, and/or any combination thereof, to support functionality provided by the vehicle onboard systems 102. For example, in some embodiments, such data repositories provide data storage functionality on the same computing devices and/or other dedicated computing devices of the vehicle onboard systems 102. Additionally or alternatively still, in some embodiments, the vehicle onboard systems 102 includes one or more specially configured integrated systems, circuits, and/or the like that process data received by and/or control one or more other computing devices and/or systems, or physical components, associated with the vehicle 112.

The vehicle 112 may embody any of a myriad of aerial vehicle types. The vehicle 112 includes any number of physical components that enable air travel, including and without limitation props, rotors, engines, wings, and/or the like. Additionally or alternatively, the vehicle 112 includes any number of a myriad of controls for operating the physical components of the vehicle 112 to achieve such airborne travel. For example, in some embodiments, the vehicle 112 includes a forward-flying aerial vehicle. In some embodiments, the vehicle 112 includes a vertical takeoff and landing aerial vehicle. It will be appreciated that the vehicle 112 may be entirely manually controlled, semi-autonomous, fully autonomous for one or more operations, or any combination thereof. Non-limiting examples of a vehicle 112 include a plane generally, a helicopter, a drone, an electric vertical takeoff and landing aircraft (eVTOL), a prop-based aircraft, a jet, and/or the like. Any particular vehicle type utilized in this disclosure is purely illustrative, and not to limit the scope and/or spirit of this disclosure or the appended claims presented herewith.

The other connected vehicle systems 104 includes computing devices, systems, and/or onboard systems of other vehicles communicatively coupled with the vehicle 112 associated with vehicle onboard systems 102. It will be appreciated that the other connected vehicle systems 104 in some embodiments includes computing devices and/or systems of one or more other aerial vehicles of the same type operating within the same environment as the aerial vehicle associated with vehicle onboard systems 102. For example, in some embodiments some of the other connected vehicle systems 104 include computing devices and/or systems of other aerial vehicles in a fleet of a particular type of aerial vehicle. In some such embodiments, sensor data (for example) captured via such other connected vehicle systems 104 similarly may be applicable to the vehicle 112 as well. Additionally or alternatively, in some embodiments, the other connected vehicle systems 104 includes computing devices and/or systems of ground vehicles, other types of aerial vehicles, and/or the like, or any combination thereof.

In some embodiments, the vehicle onboard systems 102 receives data from one or more of the other connected vehicle systems 104 that provides additional context with respect to the environment in which the vehicle 112 associated with vehicle onboard systems 102 is operating. In some contexts, such data includes sensor data that the vehicle onboard systems 102 is able to capture, or in some embodiments includes sensor data not capturable by the vehicle onboard systems 102. For example, in some embodiments, the vehicle onboard systems 102 communicates with the other connected vehicle systems 104 to determine a position of other aerial vehicles, objects, environmental features (e.g., buildings, terrain, and/or the like) within the environment of the aerial vehicle associated with vehicle onboard systems 102, and/or the like. Additionally or alternatively, in some embodiments, the vehicle onboard systems 102 communicate with one or more of the other connected vehicle systems 104 to receive sensor data of a particular data type that is not capturable directly by the vehicle onboard systems 102. For example, in some embodiments, the aerial vehicle associated with the vehicle onboard systems 102 does not include a particular sensor for capturing a particular type of sensor data, and instead receives such data of the particular data type from the other connected vehicle systems 104.

In some embodiments, the vehicle operation management systems 106 includes one or more computing devices embodied in hardware, software, firmware, and/or the like that generate, assign, and/or maintain vehicle operation constraints (e.g., trip plan data, flight plan information, mission goals, etc.) for one or more aerial vehicles. For example, in some embodiments, the vehicle operation management systems 106 include computing devices and/or systems of an air traffic control system and/or other authoritative entity that assigns flight plan information to one or more aerial vehicles. Such information includes, without limitation, flight plan information embodying a visual sight rules (VFR) flight plan, an instrument flight rules (IFR) flight plan, a composite flight plan, and/or the like defining conditions for operating a vehicle 112 within a particular environment. In some embodiments, the vehicle operation management systems 106 captures and/or otherwise obtains particular data for relaying to the vehicle 112.

In some embodiments, the vehicle operation management systems 106 includes one or more application servers, end user terminals, personal computers, mobile devices, user devices, and/or the like that generate, assign, and/or transmit flight plan information to aerial vehicles. Additionally or alternatively, in some embodiments, the vehicle operation management systems 106 includes one or more data repository/repositories embodied in hardware, software, firmware, and/or a combination thereof, that stores flight plan information, links between flight plan information and particular aerial vehicles, and/or the like. In some such embodiments, the flight plan information includes navigational data, environmental data, weather data, and/or obstacle data for one or more environments within which an aerial vehicle is or will be operating. Additionally or alternatively, in some embodiments, the vehicle operation management systems 106 includes one or more computing devices and/or systems that detect and/or monitor operation of one or more aerial vehicles within an environment. For example, in some embodiments, the vehicle operation management systems 106 includes one or more radar systems that monitor one or more environments. In various embodiments, one or more portions of data associated with the vehicle operation management systems 106 may be stored in a datastore associated with the VEM platform.

The environment data systems 108 includes one or more computing devices and/or systems that monitor, capture, and/or otherwise store data representing one or more aspects of a real-world environment, objects therein, and/or aerial vehicles therein. In some embodiments, the environment data systems 108 includes one or more data repository/repositories that store weather and/or obstacle data for one or more environments. Additionally or alternatively, in some embodiments, the environment data systems 108 includes one or more data repository/repositories that store data embodying other environmental aspects that interact with or otherwise affect operation of aerial vehicles in an environment, for example the vehicle 112. In some embodiments, the environment data systems 108 includes a satellite system that monitors one or more aspects of an environment, for example a satellite weather provider and/or satellite radio provider to the vehicle 112. Additionally or alternatively still, in some embodiments, the environment data systems 108 embody or include a flight services data provider system (e.g., a Honeywell flight services system). In some embodiments, the environment data systems 108 embodies a subsystem of the vehicle operation management systems 106 and/or other connected vehicle systems 104.

In some embodiments, the environment data systems 108 includes one or more application servers, end user terminals, personal computers, mobile devices, user devices, and/or the like. Additionally or alternatively, in some embodiments, the environment data systems 108 includes one or more database servers specially configured to store data pushed from one or more other computing devices and/or systems. In some embodiments, the environment data systems 108 includes one or more remote and/or cloud computing devices accessible to the vehicle onboard systems 102, other connected vehicle systems 104, and/or vehicle operation management systems 106 over a communications network, such as the network 110. In various embodiments, one or more portions of data associated with the environment data systems 108 may be stored in a datastore associated with the VEM platform.

In some embodiments the network 110 enables communication between various computing devices and/or systems utilizing one or more combinations of wireless and/or wired data transmission protocols. In this regard, the network 110 in some contexts embodies any of a myriad of network configurations. In some embodiments, the network 110 embodies a public network (e.g., the Internet) in whole or in part. In some embodiments, the network 110 embodies a private network (e.g., an internal network between particular computing devices) in whole or in part. Additionally or alternatively, in some embodiments the network 110 embodies a direct or private connection facilitated over satellite or radio systems that enables long-range communication between aerial vehicles and corresponding grounded systems. In some other embodiments, the network 110 embodies a hybrid network (e.g., a network enabling internal communications between particular connected computing devices and external communications with other computing devices).

The network 110 in some embodiments includes one or more base stations, relays, routers, switches, cell towers, communications cables, satellites, radio antennas and/or related control systems, and/or associated routing stations, and/or the like. In some embodiments, the network 110 includes one or more user entity-controlled computing devices and/or other enterprise devices (e.g., an end-user's or enterprise router, modem, switch, and/or other network access point) and/or one or more external utility devices (e.g., Internet service provider communication towers, cell towers, and/or other devices). In some embodiments, the vehicle onboard systems 102 communicates with one or more of the other connected vehicle systems 104, vehicle operation management systems 106, environment data systems 108 over the network 110 to receive and/or transmit the data described herein for generating the user interfaces for providing to one or more displays of an aerial vehicle. In some embodiments, the network 110 embodies a Datalink uplink to the vehicle 112 (e.g., via the vehicle onboard systems 102) that communicatively couple the airborne systems to the ground systems.

Figure 2:
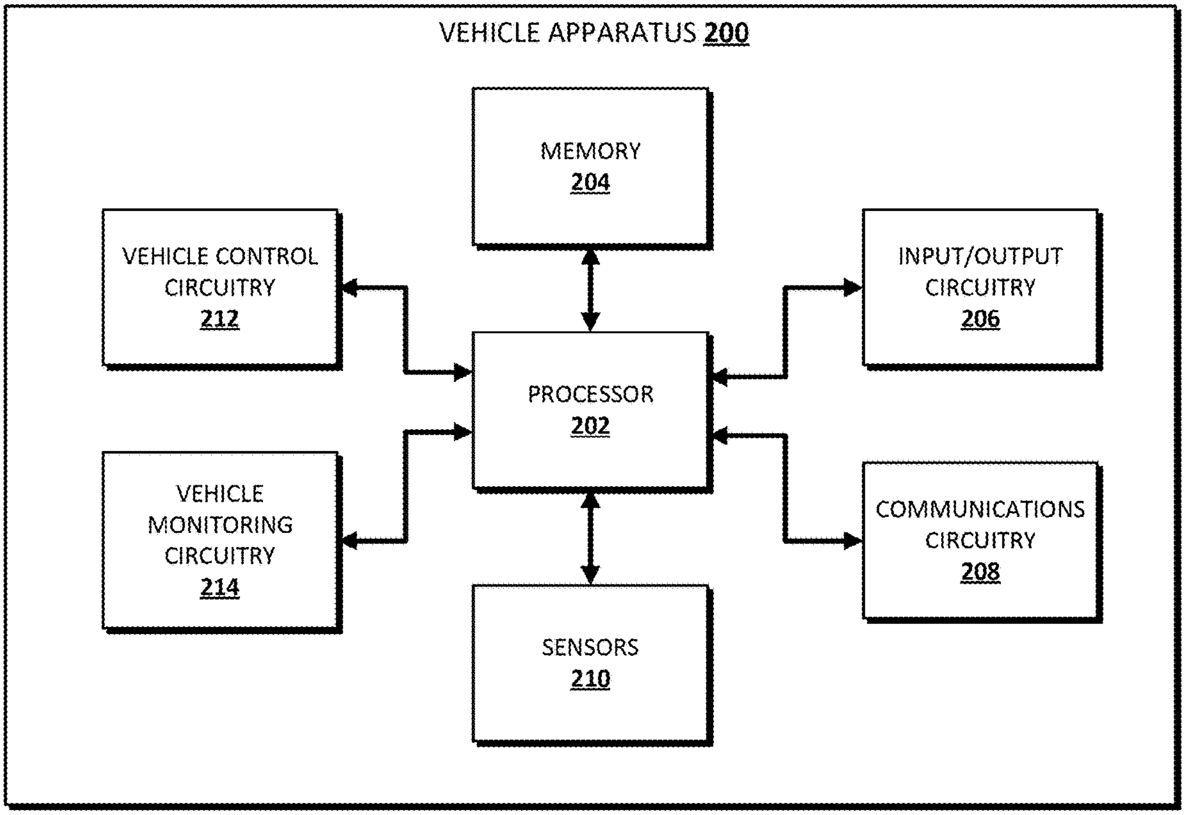
FIG. 2 illustrates an example vehicle apparatus in accordance with at least some example embodiments of the present disclosure.

FIG. 2 illustrates an example vehicle apparatus in accordance with at least some example embodiments of the present disclosure. Specifically, FIG. 2 depicts a vehicle apparatus 200. In some embodiments, one or more computing devices and/or systems of a vehicle (e.g., a vehicle 112), for example included in or embodied by the vehicle onboard systems 102 onboard a vehicle 112, is embodied by one or more computing devices such as the vehicle apparatus 200 as depicted and described in FIG. 2. As depicted, the vehicle apparatus 200 includes a processor 202, memory 204, input/output circuitry 206, communication circuitry 208, sensors 210, vehicle control circuitry 212, and/or vehicle monitoring circuitry 214. In some embodiments, the vehicle apparatus 200 is configured, using one or more of the sets of circuitry embodying processor 202, memory 204, input/output circuitry 206, communication circuitry 208, sensors 210, vehicle control circuitry 212, and/or vehicle monitoring circuitry 214, to execute one or more operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processors, network interfaces, storage mediums, and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally or alternatively, in some embodiments, other elements of the vehicle apparatus 200 provide or supplement the functionality of another particular set of circuitry. For example, the processor 202 in some embodiments provides processing functionality to any of the other sets of circuitry, the memory 204 provides storage functionality to any of other the sets of circuitry, the communication circuitry 208 provides network interface functionality to any of the other sets of circuitry, and/or the like.

In some embodiments, the processor 202 (and/or co-processor or any other processing circuitry assisting or otherwise associated with the processor) is/are in communication with the memory 204 via a bus for passing information among components of the vehicle apparatus 200. In some embodiments, for example, the memory 204 is non-transitory and includes for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the vehicle apparatus 200 to carry out various functions in accordance with example embodiments of the present disclosure. Furthermore, in various embodiments, the memory 204 is configured to store one or more portions of data related to a datastore associated with a VEM platform associated with a vehicle embodying a respective vehicle apparatus 200.

In various embodiments, the processor 202 is embodied in a number of different ways. For example, in some example embodiments, the processor 202 includes one or more processing devices configured to perform independently. Additionally or alternatively, in some embodiments, the processor 202 includes one or more processors configured in tandem via a bus to enable independent execution of instructions, pipelining, and/or multithreading. The use of the terms "processor" and "processing circuitry" should be understood to include a single core processor, a multi-core processor, multiple processors internal to the vehicle apparatus 200, and/or one or more remote or "cloud" processors external to the vehicle apparatus 200.

In an example embodiment, the processor 202 is configured to execute instructions stored in the memory 204 or otherwise accessible to the processor 202. Additionally or alternatively, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Additionally or alternatively, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with executing one or more recommendations generated by the vehicle performance prediction model, for example as described with respect to operating and/or reconfiguring the vehicle onboard systems 102 in FIG. 1 and/or as described further herein. In some embodiments, the processor 202 includes hardware, software, firmware, and/or a combination thereof, that receives and/or generates data including one or more portions of vehicle performance data, vehicle sensor data, environmental data, logistical data, and/or data related to one or more adverse situations impacting the operation of a vehicle (e.g., a vehicle 112).

Additionally or alternatively, in some embodiments, the processor 202 includes hardware, software, firmware, and/or a combination thereof, that causes rendering of one or more recommendations generated by the vehicle performance prediction model via one or more electronic interfaces associated with the vehicle apparatus 200 and/or one or more electronic interfaces associated with other computing devices related to the VEM platform (e.g., an RVOH apparatus associated with the RVOH). Additionally or alternatively, in some embodiments, the processor 202 includes hardware, software, firmware, and/or a combination thereof, that in real-time updates rendering of a user interface and/or interface elements thereof in response to updated data related to the one or more adverse situations, one or more recommendations associated with the one or more adverse situations, and/or one or more portions of data associated with the operation of the vehicle 112.

In some embodiments, the vehicle apparatus 200 includes input/output circuitry 206 that provides output to the user and, in some embodiments, to receive an indication of a user input (e.g., user input generated by a pilot, operator, crew member, and/or passenger). In some embodiments, the input/output circuitry 206 is in communication with the processor 202 to provide such functionality. The input/output circuitry 206 in some contexts comprises one or more user interfaces and, in some embodiments, includes a display that comprises the interfaces rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms.

The processor 202, and/or input/output circuitry 206 comprising a processor, in some embodiments is configured to control one or more functions of one or more user interface elements through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a computing device and/or other display associated with a user. In some embodiments, the input/output circuitry 206 includes a primary flight display and/or a multi-function display of an aerial vehicle. Additionally or alternatively, in some embodiments, the input/output circuitry 206 includes one or more software-rendered user interfaces including interface elements that depict particular data and/or information, and/or that receive user input.

The communication circuitry 208 includes any means such as a device or circuitry embodied in either hardware or a combination of hardware and software that is configured to receive and/or transmit data from/to a communications network and/or any other computing device, circuitry, or module in communication with the vehicle apparatus 200. In this regard, the communication circuitry 208 includes, for example in some embodiments, a network interface for enabling communications with a wired or wireless communications network. Additionally or alternatively in some embodiments, the communication circuitry 208 includes one or more network interface cards, antennas, buses, switches, routers, modems, and supporting hardware, firmware, and/or software, or any other device suitable for enabling communications via one or more communications networks. Additionally or alternatively, the communication circuitry 208 includes circuitry for interacting with the antennas and/or other hardware or software to cause transmission of signals via the antennas or to handle receipt of signals received via the antennas. In some embodiments, the communication circuitry 208 enables transmission to and/or receipt of data from one or more computing devices and/or systems of other connected vehicle systems 104, vehicle operation management systems 106, and/or environment data systems 108, in communication with the vehicle apparatus 200.

The sensors 210 includes hardware, software, firmware, and/or a combination thereof, that supports generation, capturing, aggregating, retrieval, and/or receiving of one or more portions of sensor data. In some embodiments, the sensors 210 includes one or more discrete components of a vehicle (e.g., a vehicle 112). The sensors 210 in some embodiments are affixed to, within, and/or otherwise as a part of an aerial vehicle including or otherwise associated with the vehicle apparatus 200. For example, in some embodiments, one or more of the sensors 210 is/are mounted to the aerial vehicle, such as the vehicle 112. Non-limiting examples of sensors 210 include altimeters (e.g., radio and/or barometric), pressure sensors, pilot tubes, anemometers, image cameras, video cameras, infrared sensors, speed sensors, battery sensors, fuel level sensors, biological sensors and/or the like. In some embodiments, the sensors 210 are integrated with, or embodied by, one or more of the vehicle onboard systems 102 such that the sensors 210 generate, collect, monitors, and/or otherwise obtain data related to the one or more vehicle onboard systems 102.

In some embodiments, the sensors 210 additionally or alternatively include any of a myriad of sensors conventionally associated with drones, helicopters, and/or other urban air mobility aerial vehicles. Additionally or alternatively, in some embodiments, the sensors 210 include one or more high-sensitivity sensors to facilitate enable high accuracy capturing of data in certain circumstances. For example, in some embodiments, the sensors 210 includes one or more high-sensitivity sensors that capture detailed data while an aerial vehicle is in flight. Such higher fidelity sensors in some contexts supplement and/or, in other embodiments, replace the data captured by such sensors with lower fidelity.

In some embodiments, the sensors 210 includes hardware, software, firmware, and/or a combination thereof, embodying one or more navigation sensors. In some embodiments, the navigation sensors include a global positioning satellite (GPS) tracking chip and/or the like enabling location services to be requested and/or determined for a particular aerial vehicle. Additionally or alternatively, in some embodiments, the sensors 210 includes hardware, software, firmware, and/or any combination thereof, embodying inertial navigation sensors that measures speed, acceleration, orientation, and/or position-related data in a 3D environment. Additionally or alternatively, in some embodiments, the sensors 210 includes one or more cameras associated with a synthetic vision system (SVS). In some such embodiments, such an SVS camera captures image data representations of the real-world environment around an aerial vehicle for use in generating corresponding user interfaces depicting the captured image data, augmenting such image data, and/or otherwise providing data to enable an operator to acquire situational awareness based at least in part on the captured image data. It will be appreciated that, in some embodiments, the sensors 210 includes a separate processor, specially configured field programmable gate array (FPGA), or a specially programmed application specific integrated circuit (ASIC).

The vehicle control circuitry 212 includes hardware, software, firmware, and/or a combination thereof, that supports functionality associated with navigating and/or controlling a vehicle (e.g., a vehicle 112). In some embodiments, vehicle control circuitry 212 can control and/or configure one or more of the vehicle onboard systems 102. In some embodiments, vehicle control circuitry 212 includes hardware, software, firmware, and/or a combination thereof, that receives trip plan data (e.g., trip plan data embodying a flight plan), location services data representing a location of a vehicle 112, and/or the like. Additionally or alternatively, in some embodiments, the vehicle control circuitry 212 includes hardware, software, firmware, and/or a combination thereof, that depicts interface elements representing at least a flight path or indication where the vehicle 112 is currently traveling and/or should travel.

Additionally or alternatively, in some embodiments, the vehicle control circuitry 212 includes hardware, software, firmware, and/or a combination thereof, that autonomously controls one or more components of an aerial vehicle. In some such embodiments, the vehicle control circuitry 212 autonomously controls one or more physical components of a vehicle (e.g., a vehicle 112) to facilitate movement of the vehicle along a particular path. Additionally or alternatively, in some embodiments, the vehicle control circuitry 212 includes hardware, software, firmware, and/or a combination thereof, that semi-autonomously controls one or more components of an aerial vehicle, for example where certain aspects of the operation of the aerial vehicle are autonomously performed and others (e.g., directional control) is/are controlled by a user (e.g., a pilot).

Additionally or alternatively, in some embodiments, the vehicle control circuitry 212 includes hardware, software, firmware, and/or a combination thereof, that receives pilot input for controlling one or more components of an aerial vehicle, for example via vehicle flight controls to alter speed and/or direction of the aerial vehicle. Additionally or alternatively, in some embodiments, the vehicle control circuitry 212 includes hardware, software, firmware, and/or a combination thereof, that causes changes to an operational mode (e.g., an alternate, energy-conserving operational mode) of an aerial vehicle, for example autonomously based at least in part on one or more data-driven adverse situations and/or triggers, or in response to user input initiating the change in operational mode. It will be appreciated that, in some embodiments, the vehicle control circuitry 212 includes a separate processor, specially configured field programmable gate array (FPGA), or a specially programmed application specific integrated circuit (ASIC).

The vehicle monitoring circuitry 214 includes hardware, software, firmware, and/or a combination thereof, that supports functionality associated with the onboard VEM system associated with a vehicle (e.g., a vehicle 112). For example, the vehicle monitoring circuitry 214 executes, at least in part, one or more portions of program code associated with the methods and operations of the onboard VEM system. For example, the vehicle monitoring circuitry 214 includes hardware, software, firmware, and/or a combination thereof, that can receive, generate, analyze and/or otherwise process one or more portions of data input comprising vehicle performance data, vehicle sensor data, vehicle operation data, vehicle system data, air traffic data, environmental data, logistical data, personnel data, and/or any other relevant data related to a particular vehicle (e.g., a vehicle 112).

Additionally, the vehicle monitoring circuitry 214 includes hardware, software, firmware, and/or a combination thereof, that can cause the storage of one or more portions of data associated with the onboard VEM system. Additionally or alternatively, the vehicle monitoring circuitry 214 includes hardware, software, firmware, and/or a combination thereof, that can interface with, control, configure, and/or otherwise operate one or more legacy vehicle systems, legacy software, and/or legacy hardware associated with a vehicle (e.g., a vehicle 112) based at least in part on model output (e.g., recommendations) generated by the vehicle performance prediction model.

It will be appreciated that, further in some embodiments, two or more of the sets of circuitries 202-214 are combinable. Additionally or alternatively, in some embodiments, one or more of the sets of circuitry 202-214 perform some or all of the functionality described associated with another component. For example, in some embodiments, one or more of the sets of circuitry 202-214 are combined into a single component embodied in hardware, software, firmware, and/or a combination thereof. For example, in some embodiments, two or more of the vehicle control circuitry 212 and vehicle monitoring circuitry 214 are embodied by a single set of circuitry that performs the combined operations of the individual sets of circuitry. Similarly, in some embodiments, one or more of the sets of circuitry, for example vehicle control circuitry 212 and/or vehicle monitoring circuitry 214 is/are combined with the processor 202, such that the processor 202 performs one or more of the operations described above with respect to each of these other sets of circuitry.

Figure 3:
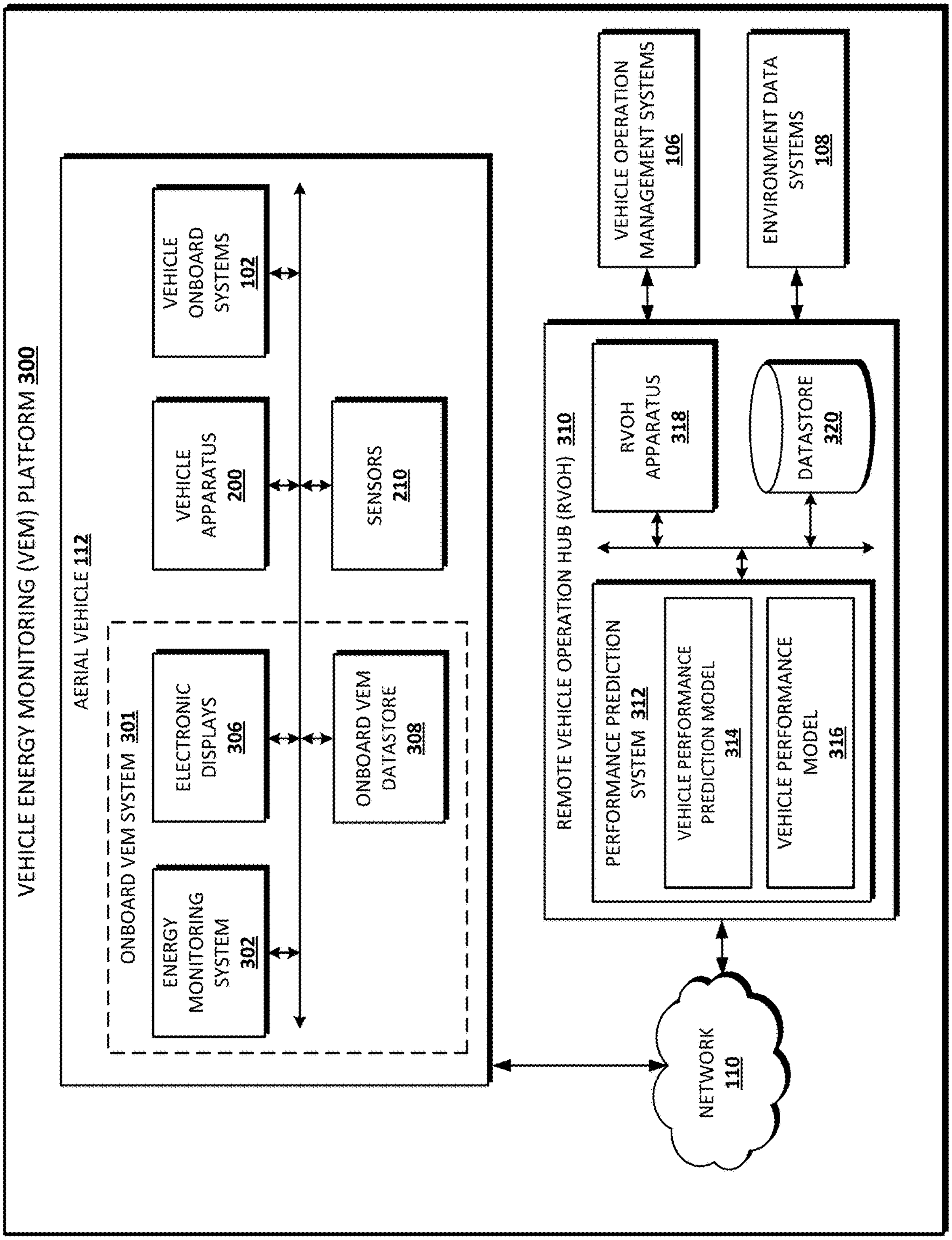
FIG. 3 illustrates an example vehicle energy monitoring (VEM) platform in accordance with at least some example embodiments of the present disclosure.

FIG. 3 illustrates an example VEM platform 300 in accordance with at least some example embodiments of the present disclosure. As depicted, FIG. 3 depicts the various operational services, systems, components, apparatuses, and datastores embodied by the VEM platform 300. For example, the VEM platform 300 includes RVOH 310 comprising an RVOH apparatus 318 and/or a datastore 320. In various embodiments, the RVOH 310 integrates and/or communicates with one or more vehicle operation management systems 106 and/or one or more environment data systems 108. In various embodiments, the RVOH 310, vehicle operation management systems 106 and/or environment data systems 108, in some contexts, communicate via the network 110.

The VEM platform 300 also comprises an onboard VEM system 301 embodied by the vehicle 112. In various embodiments, the onboard VEM system 301 in some contexts integrates with, or is embodied by, the vehicle apparatus 200. Additionally or alternatively, in various contexts, the onboard VEM system 301 integrates with the vehicle onboard systems 102 and/or the sensors 210 associated with the vehicle 112. In various embodiments, the RVOH 310 communicates with the onboard VEM system 301 via the network 110. For example, the RVOH 310 communicates with the onboard VEM system 301 through one or more of the component parts of the RVOH apparatus 318 (e.g., communication circuitry) and one or more component parts of the vehicle apparatus 200 (e.g., communication circuitry 208) via the network 110.

Due to the distributed nature of the various embodiments of the present disclosure, the VEM platform 300 and the operational systems and/or services comprised therein, in some contexts, are configured to freely pass data via one or more communications networks (e.g., network 110) in order to optimally delegate one or more operations described herein to one or more respective computing devices associated with the VEM platform 300. This delegation of operations provides the benefit of optimizing the capabilities of a particular vehicle (e.g., a particular vehicle 112) based at least in part on the processing power associated with the particular vehicle. As will be appreciated, the delegation of certain methods, procedures, calculations, computations, configurations, predictions, and/or the like throughout the distributed operational systems and/or services of the VEM platform 300 reduces the load on the vehicle onboard systems 102 of the vehicle as well as the load on the computing devices (e.g., the RVOH apparatus 318) of the RVOH 310.

The VEM platform 300 may comprise various data storage systems deployed in various configurations. As defined herein, a database and/or datastore (e.g., datastore 320) in some contexts is any type of non-transitory computer-readable storage medium. Non-limiting examples include hardware, software, firmware, and/or a combination thereof capable of storing, recording, updating, retrieving and/or deleting computer-readable data and information related to the VEM platform 300.

In various embodiments, one or more databases can be embodied by a vehicle 112 and/or associated with the onboard VEM system 301 such as, for example, the onboard VEM datastore 308. In some contexts, one or more databases (e.g., the onboard VEM datastore 308) embodied by a vehicle 112 can be accessible via a communications network (e.g., the network 110) by one or more components of the various embodiments of the present disclosure (e.g., the RVOH apparatus 318). In various embodiments, a database and/or datastore (e.g., onboard VEM datastore 308 and/or datastore 320) in some contexts is a cloud-based storage system accessible via a communications network (e.g., the network 110) by one or more components of the various embodiments of the present disclosure.

The onboard VEM system 301 of a respective vehicle (e.g., a vehicle 112) comprises an energy monitoring system 302, one or more electronic displays 306, and/or an onboard VEM datastore 308. The onboard VEM system 301 is configured to monitor the energy expenditure of a vehicle (e.g., a vehicle 112), one or more current values associated with one or more respective battery parameters associated with a battery system of the vehicle, data related to an adverse situation, and/or the like. In some embodiments, the onboard VEM system 301 embodies and/or integrates with an application instance configured to integrate with one or more vehicle systems and/or apparatuses associated with a vehicle managed by the VEM platform 300. As such, one or more onboard VEM systems 301 associated with one or more vehicles can enable the RVOH 310 to function as a centralized system for facilitating the management of the one or more vehicles.

The onboard VEM system 301, in some contexts, integrates with, or can be embodied by, a computing device such as an LRU. For example, the onboard VEM system 301 in some contexts is embodied by an aerospace gateway LRU configured to communicate with one or more vehicle systems. The RVOH 310 and one or more onboard VEM systems 301 associated with one or more respective vehicles remain in constant communication and are configured to transmit and/or receive data related to the operation of the one or more vehicles via a communications network (e.g., network 110). In this regard, the onboard VEM system 301 in some contexts generates and transmits one or more portions of data to the RVOH 310 via the communications network. The one or more portions of data may include, but are not limited to, vehicle operation data, a current energy expenditure of a vehicle (e.g., a vehicle 112), current values associated with one or more respective battery parameters associated with a battery system of the vehicle (e.g., the current state of charge (SoC), a state of health (SoH), a state of function (SoF), and/or temperature), the current operational health of the one or more vehicle systems associated with the vehicle, any other relevant vehicle operation data related to the energy consumption of the vehicle, data related to an adverse situation, sensor data, hazard data, and/or the like.

The energy monitoring system 302 includes hardware, software, firmware, and/or a combination thereof, that in some contexts is employed to monitor, configure, control, access and/or otherwise manage one or more batteries, battery cells, battery interfaces, electrical components, and/or the like associated with a battery system of a respective vehicle (e.g., a vehicle 112). As such, the energy monitoring system 302 is, in some contexts, configured to generate, aggregate, compile, gather, retrieve, and/or otherwise access data related to one or more values associated with one or more respective battery parameters related to the battery system of the respective vehicle (e.g., the vehicle 112). Additionally or alternatively, in various embodiments, the energy monitoring system 302 is configured to monitor, configure, control, access and/or otherwise manage one or more fuel systems, propellant systems, and/or other energy systems associated with the respective vehicle (e.g., a vehicle 112).

In various contexts, the energy monitoring system 302 is configured to transmit one or more portions of data related to the one or more values associated with the one or more respective battery parameters to the various other components of the onboard VEM system 301 such as, for example, the onboard VEM datastore 308. Furthermore, the energy monitoring system 302 may be configured to, in contexts, transmit one or more portions of data to the vehicle apparatus 200 and/or one or more of the vehicle onboard systems 102 associated with the respective vehicle (e.g., the vehicle 112). In various embodiments, the data related to the one or more values associated with the one or more respective battery parameters related to the battery system of the respective vehicle may be configured as vehicle operation data configured as model input for one or more ML models associated with the performance prediction system 312.

The data related to the one or more values associated with the one or more respective battery parameters related to the battery system of the respective vehicle may include, but are not limited to, an SoC, an SoH, an SoF, and/or a temperature associated with the battery system of the vehicle. The SoC is related to how much charge is left in a battery cell at a given time. The SoH is related to the ability of a respective battery cell to retain a charge (e.g., as compared to the initial ability of the battery cell when manufactured). The SoF is related a readiness of a respective battery cell in terms of usable energy derived by, for example, determining a current SoC of a battery cell in relation to the overall available capacity of the battery cell. In various contexts, the SoC, SoH, and/or SoF are determined by the vehicle performance model 316 of a performance prediction system 312 in conjunction with an energy monitoring system 302 of a respective vehicle.

The electronic displays 306 associated with the onboard VEM system 301 may comprise, in various contexts, one or more cockpit displays, one or more vertical situation displays (VSDs), one or more PFDs, one or more displays associated with an FMS, one or more displays associated with a navigation system, one or more displays associated with one or more respective LRUs, one or more computer displays, and/or the like. In various contexts, the one or more electronic displays 306 can be associated with one or more computing devices associated with the RVOH 310.

The onboard VEM datastore 308 is configured to store and/or manage one or more portions of data related to vehicle operation data, vehicle sensor data, adverse situation data, vehicle state data, one or more values associated with the one or more respective battery parameters, and/or the like. In various embodiments, the onboard VEM datastore 308 can be embodied by a vehicle 112 and/or associated with the onboard VEM system 301 associated with the vehicle 112. In various contexts, the onboard VEM datastore 308 can receive one or more portions of data related to a particular vehicle (e.g., a vehicle 112) via the network 110. Furthermore, the one or more portions of aforementioned data can be associated with a vehicle identifier of a respective vehicle (e.g., a vehicle 112).

As described herein, in various embodiments, the VEM platform 300 comprises an RVOH 310 configured for the offboard management and control of a fleet of vehicles associated with an enterprise. In this regard, the VEM platform 300 is configured as a distributed management system such that one or more vehicles integrate with a respective onboard VEM system 301 communicably coupled to the RVOH 310. The RVOH 310, in conjunction with a particular instance of the onboard VEM system 301 associated with a particular vehicle (e.g., a vehicle 112), is configured to monitor, manage, and/or improve the performance of the particular vehicle by providing VEM to one or more operators associated with the particular vehicle. The RVOH 310 and one or more onboard VEM systems 301 associated with one or more respective vehicles remain in constant contact and are configured to transmit and/or receive data related to the operation of the one or more vehicles via the network 110. The RVOH 310 comprises one or more computing devices (e.g., the RVOH apparatus 318), one or more ML models, and/or one or more datastores (e.g., the datastore 320) configured to monitor and/or manage one or more vehicles.

As described herein, in various contexts, the onboard VEM system 301 associated with a respective vehicle (e.g., a vehicle 112) can transmit one or more portions of data to the RVOH 310 via the network 110. For example, the onboard VEM system 301 can be configured to transmit one or more portions of data related to a current energy expenditure of the vehicle, one or more current values associated with one or more respective battery parameters associated with a battery system of the vehicle, data related to an adverse situation, and/or the like. In this regard, in various embodiments, the RVOH apparatus 318 of the RVOH 310 can be configured to execute one or more operations based on the data received from the onboard VEM system 301. In various examples, such as when an electric aerial vehicle is completely autonomous, the RVOH apparatus 318 can be configured to perform at least a portion of the processing associated with the onboard VEM system 301 associated with the electric aerial vehicle. As such, the computational resources needed by the electronic aerial vehicle may be advantageously reduced.

As shown in FIG. 3, the RVOH 310 comprises the performance prediction system 312, the RVOH apparatus 318, and the datastore 320. The performance prediction system 312 comprises hardware, software, firmware, and/or a combination thereof associated with the RVOH 310 that is configured to predict an energy expenditure a respective vehicle during execution of a trip plan (e.g., a planned navigation route for the respective vehicle). The performance prediction system 312 is also configured to generate an energy visualization representing the predicted energy expenditure of the respective vehicle. Furthermore, in various contexts, the performance prediction system 312, in conjunction with a vehicle performance model 316, is configured to determine that a current energy expenditure of the vehicle does not match a predicted energy expenditure associated with particular trip plan being executed by the vehicle.

In various embodiments, the performance prediction system 312 comprises one or more statistical, algorithmic, and/or ML configured to perform the one or more methods described herein. In some examples, the performance prediction system 312 comprises one or more math models, rule expression models and/or specialized deep learning neural networks. In various other examples, the performance prediction system 312 comprises a time series data analysis model. In one or more embodiments, the performance prediction system 312 comprises a vehicle performance prediction model 314 and/or a vehicle performance model 316.

In various contexts, a performance prediction system 312 comprising the vehicle performance prediction model 314 may determine, as part of a pre-trip validation process, the predicted energy expenditure of a vehicle based on a vehicle profile, a trip plan associated with the vehicle, and/or one or more environmental factors. The vehicle profile may comprise data related to at least one of a vehicle type, a vehicle identifier, a vehicle battery system configuration, a number of passengers, and/or a vehicle payload weight.

In this regard, the performance prediction system 312 can receive one or more trip plans associated with a respective vehicle (e.g., a vehicle 112). The performance prediction system 312 is configured to determine, based on inputting results from the pre-trip validation process and the corresponding trip plan into the vehicle performance prediction model 314, whether the trip plan is feasible. In various contexts, determining whether the trip plan is feasible comprises correlating the trip plan and/or the results from the pre-trip validation process with one or more current values associated with one or more battery parameters associated with the battery system of the vehicle.

Additionally or alternatively, the performance prediction system 312 may determine whether a particular trip plan is feasible based in part on a predefined energy reserve requirement associated with the vehicle. For example, in various contexts, one or more vehicles (e.g., one or more vehicles 112) associated with a respective VEM platform 300 may be configured to adhere a predefined energy reserve requirement (e.g., an energy reserve requirement of 15%) regulating that a battery system of a respective vehicle must have a required amount of energy reserves relative to an available energy capacity of the battery system after arriving at a final destination associated with the particular trip plan.

In a scenario in which the performance prediction system 312 determines that a particular trip plan is not feasible, the performance prediction system 312 can cause display of a recommendation prompting entry of an alternative trip plan (e.g., a second trip plan), where the recommendation is configured to be displayed via one or more electronic displays associated with the vehicle (e.g., electronic displays 306) and/or one or more electronic displays associated with the RVOH 310 (e.g., electronic displays associated with the RVOH apparatus 318).

The vehicle performance prediction model 314 refers to an ML model associated with the performance prediction system 312. In various contexts, the vehicle performance prediction model 314 is configured as a deep learning neural network such as an artificial neural network, (ANN), recurrent neural network (RNN), convolutional neural network (CNN), and/or any other specialized deep learning neural network. In various contexts, the vehicle performance prediction model 314 is configured predict an energy expenditure associated with a respective vehicle. The vehicle performance prediction model 314 is also configured to generate, in conjunction with the RVOH apparatus 318, a predicted energy visualization representing the predicted energy expenditure of the respective vehicle.

In various contexts, the predicted energy visualization corresponds to a predicted energy expenditure of the vehicle for one or more defined travel legs between a plurality of flight phases and/or waypoints associated with a trip route of a trip plan associated with the vehicle. In various examples, the predicted energy visualization is displayed on a situation interface in relation to the one or more defined travel legs between a plurality of flight phases and/or waypoints associated with the trip route. Furthermore, the predicted energy visualization is configured to be plotted along at least one axis of the situation interface representing a position of the vehicle along the trip route. For example, the general shape of the predicted energy visualization corresponds to the predicted energy expenditure of the vehicle at certain points along the trip route (e.g., certain flight phases, waypoints, etc.) that have been plotted along at least one axis of the situation interface. This offers the benefit of being able to quickly interpret the project SoF of the battery system of the vehicle at various points along the trip route.

In various examples, the vehicle performance prediction model 314 can determine an updated predicted energy expenditure of the vehicle based on updated vehicle operation data collected in real-time. The updated vehicle operation data may comprise at least one portion of data associated with one or more factors affecting a current energy expenditure of the vehicle. For example, the updated vehicle operation data may comprise at least one of a current load on the vehicle battery system, the current energy expenditure, a current elevation of the vehicle, one or more upcoming flight phases, one or more current environmental factors, a current battery SoF, or a current operational health of one or more vehicle systems. As such, the RVOH apparatus 318 is configured to display an updated predicted energy visualization based on the updated predicted energy expenditure on the situation interface.

The predicted energy visualization can be displayed via an electronic display associated with one or more respective computing devices (e.g., a primary flight display of an aerial vehicle, an electronic display associated with the RVOH apparatus 318, etc.). Furthermore, the predicted energy visualization is characterized by at least one of a color-code, a shading scheme, a pattern, a transparency, a gradient, and/or a shape that is determined based on one or more predicted values associated with one or more battery parameters associated with a battery system (e.g., a current SoF, SoC, and/or SoH) of the vehicle. The one or more battery parameters may be related to the predicted energy expenditure of the vehicle based at least in part on the trip plan being executed by the vehicle and/or a remaining distance to cover between a current location of the vehicle and a final destination associated with the trip plan. In various embodiments, the color-code, shading scheme, pattern, transparency, gradient, and/or a shape associated with the predicted energy visualization may be configured based on one or more system configuration preferences defined for a particular VEM platform 300 (e.g., defined via the RVOH apparatus 318).

In a first non-limiting example scenario, if a vehicle performance prediction model 314 associated with the RVOH predicts that a vehicle (e.g., an aerial vehicle) will have a certain energy level (e.g., a certain SoC associated with the battery system) when arriving at a final destination (e.g., a predicted energy level corresponding to 30% of an available energy capacity of the battery system) and the predicted energy level associated with the final destination is above a predefined energy reserve requirement (e.g., an energy reserve requirement of 15%), the predicted energy visualization associated with one or more travel legs to be covered enroute to the final destination may be colored white.

However, in a second non-limiting example scenario, if, due to an adverse situation (e.g., related to a battery malfunction and/or suboptimal environmental factors), the battery discharge is faster than usual and the vehicle performance prediction model 314 determines that the vehicle (e.g., the aerial vehicle) will not reach the final destination with an energy level that was originally predicted (e.g., a predicted energy level corresponding to 30% of an available energy capacity of the battery system), the vehicle performance prediction model 314 may determine at which point during the trip plan the predicted energy expenditure of the vehicle will reach and/or fall below a predefined energy reserve requirement associated with the vehicle (e.g., an energy reserve requirement of 15%). In this regard, the vehicle performance prediction model 314 may determine that the predicted energy expenditure may satisfy (e.g., meet, exceed, and/or fall short of) one or more energy level thresholds. For example, the one or more energy thresholds may be associated with a determined battery parameter value (e.g., an SoC of 35% of the capacity of the battery system), and/or with a predetermine energy reserve requirement (e.g., an energy reserve requirement of 15%).

As such, if it is determined that the predicted energy expenditure may satisfy (e.g., meet, exceed, and/or fall short of) one or more energy level thresholds, the predicted energy visualization associated with one or more travel legs yet to be covered by the vehicle may be shown in various colors corresponding to the one or more energy level thresholds. For example, if the predicted energy expenditure falls below a first energy level threshold (e.g., an SoC of 35%) the predicted energy visualization may be shown in yellow until the predicted energy expenditure of the vehicle reaches a point (e.g., a respective flight phase and/or waypoint) in the trip plan associated with an energy reserves threshold associated with the predefined energy reserve requirement (e.g., the energy reserve requirement of 15%). The predicted energy visualization associated with any travel legs, flight phases, and/or waypoints associated with a predicted energy expenditure falling below the predefined energy reserve requirement (e.g., the energy reserve requirement of 15%) may be colored red.

Additionally or alternatively, the vehicle performance prediction model 314, in conjunction with the RVOH apparatus 318, is configured to generate one or more vertical indicators to be rendered on the situation interface in relation to the trip route plotted along the at least one axis of the situation interface. In some examples, the one or more vertical indicators may be associated with the particular point along the trip route for which the predicted energy expenditure of the vehicle is projected to reach the one or more energy level thresholds. Additionally or alternatively, in various examples, the one or more vertical indicators rendered on the situation interface may be associated with a plurality of recommendations generated by the vehicle performance prediction model 314 to mitigate one or more adverse situations impacting the operation of the vehicle.

The vehicle performance prediction model 314 is also configured to determine, generate, and/or cause transmission of one or more recommendations in response to receiving model output generated by the vehicle performance model 316. The vehicle performance prediction model 314 in some contexts is configured to execute, or cause execution, of the one or more recommendations based on one or more rules. For example, in one or more embodiments, the vehicle performance prediction model 314, in some contexts, directs the vehicle apparatus 200 to execute the one or more recommendations by operating, updating configurations for, and/or otherwise controlling one or more respective vehicle systems associated with a vehicle (e.g., a battery system associated with the vehicle 112).

As described herein, a recommendation represents one or more suggested actionable measures that in some contexts is executed to mitigate, correct, address, and/or otherwise improve one or more adverse situations impacting the operation of a vehicle. In some embodiments, a recommendation embodies model output generated by the vehicle performance prediction model 314. Recommendations, in some contexts, are configured to be human-readable and is rendered via a respective electronic interface associated with one or more computing devices such as, for example a vehicle apparatus 200 associated with the vehicle and/or an RVOH apparatus 318 associated with the RVOH 310. For example, in some contexts, one or more recommendations can be rendered in a remote vehicle operation interface associated with one or more respective electronic displays associated with the RVOH apparatus 318.

In various contexts, a recommendation may be associated with one or more of one or more candidate travel hubs and/or an optimal travel hub. For example, in various contexts, a particular recommendation may be a recommendation to navigate the vehicle to the nearest candidate travel hub in response to determining that an adverse situation is impacting the operation of the vehicle (e.g., a failure of a particular vehicle system). As another non-limiting example, a particular recommendation may be a recommendation to switch the vehicle into an alternate, energy-conserving operational mode in response to determining that the batteries associated with the vehicle are discharging at an unexpected rate.

In various embodiments, recommendations are executed automatically by the performance prediction system 312. In various other embodiments, the recommendations in some contexts are confirmed by an operator of the vehicle, where confirmation is a selection indication associated with the recommendations generated via one or more computing devices and where the confirmation causes execution of the recommendations. Executing a recommendation comprises operating one or more systems associated with the vehicle to control the operation of the vehicle. In some embodiments, the execution of a recommendation must be confirmed via a computing device (e.g., a vehicle apparatus 200 and/or an RVOH apparatus 318). In various other embodiments, recommendations in some contexts are automatically executed depending on the criticality of the corresponding adverse situation impacting the operation of the vehicle.

Additionally, the vehicle performance prediction model 314 in some contexts determines which recommendations of a plurality of recommendations will have the greatest positive effect on a current adverse situation impacting the operation of a vehicle. For example, in some embodiments, the vehicle performance prediction model 314 ranks one or more recommendations of the set of recommendations based at least in part on a predicted result associated with the execution of the one or more recommendations. For instance, a first recommendation in some contexts is ranked higher relative to a second recommendation based at least in part on a predicted result associated with the first recommendation. Based on the ranking of the one or more recommendations, the vehicle performance prediction model 314 may give a particular recommendation priority by highlighting, pre-selecting, and/or otherwise calling attention to the particular recommendation on a remote vehicle operation interface associated with the RVOH apparatus 318.

Furthermore, the vehicle performance prediction model 314 is configured to determine, in conjunction with the vehicle performance model 316, if the one or more recommendations that were executed have successfully mitigated, addressed, corrected, and/or otherwise improved the adverse situation impacting the operation of the vehicle. For example, if the vehicle performance prediction model 314 determines, in conjunction with the vehicle performance model 316, that a first set of recommendations generated based on a first set of rules have been executed but the one or more adverse situations have not been mitigated, addressed, corrected, and/or otherwise improved, the vehicle performance prediction model 314 can cause generation of a second set of recommendations with which to mitigate the one or more adverse situations impacting the operation of the vehicle.

A vehicle performance prediction model 314, in some contexts, is iteratively retrained and/or otherwise updated based on data related to one or more vehicles associated with the VEM platform 300. For example, the vehicle performance prediction model 314 in some contexts is trained and/or retrained based in part on one or more portions of vehicle performance data related to one or more vehicles associated with one or more respective enterprises related to the VEM platform 300. Additionally or alternatively, the vehicle performance prediction model 314, in some contexts, is also trained and/or retrained based in part on one or more portions of adverse situation data. The adverse situation data comprises but is not limited to data related to the one or more adverse situations that caused a particular vehicle to enter into an adverse state and/or data related to one or more respective rules and/or recommendations with which the onboard VEM system 301 employed to mitigate the one or more adverse situations.

In this way, the vehicle performance prediction model 314 in some contexts is constantly updated based on a global corpus of vehicle performance data and/or adverse situation data related to many vehicles associated with many respective enterprises. As such, the vehicle performance prediction model 314 is consistently improving in both accuracy and efficiency. In certain embodiments, the vehicle performance prediction model 314 is retrained and/or otherwise updated on a predefined schedule such as, for example, daily, weekly, bi-weekly, monthly, and/or the like.

As shown in FIG. 3, the performance prediction system 312 also comprises a vehicle performance model 316. The vehicle performance model 316 is an ML model that is specially configured to receive one or more portions of vehicle operation data (e.g., data related to one or more battery parameters) and, based at least in part on the one or more portions of vehicle operation data, generate one or more portions of vehicle performance data describing one or more operational states of the vehicle. Additionally, the vehicle performance model 316 is configured to identify, classify, categorize, and/or analyze one or more adverse situations impacting the operation of a vehicle.

The vehicle performance model 316 in some contexts generates one or more portions of model output (e.g., vehicle performance data) configured to describe the current status, energy expenditure, operational parameters, data values, operational modes, and/or configurations of one or more vehicle systems associated with the vehicle. In this regard, if the vehicle performance model 316 determines that one or more adverse situations are taking place that are impacting the operation of the vehicle, the vehicle performance model 316 determines how the one or more adverse situations are related to (e.g., how the one or more adverse situations are impacting) the respective vehicle systems (e.g., a battery system of the vehicle).

As such, the vehicle performance model 316 generates one or more portions of vehicle performance data related to the current operational status of the vehicle as model output. The one or more portions of vehicle performance data are one or more portions of data that have been configured for logging, analysis, ML model input, ML model training, and/or storage. For example, the vehicle performance model 316, in some contexts, transmits one or more portions of vehicle performance data to the vehicle performance prediction model 314 associated with the performance prediction system 312. In various contexts, one or more portions of vehicle performance data can be stored, accessed, retrieved, and/or otherwise managed by a datastore 320 associated with the RVOH 310.

Furthermore, in various embodiments, the vehicle performance model 316, in some contexts, is configured to classify the criticality of one or more adverse situations associated with a vehicle (e.g., a vehicle 112). For instance, once the vehicle performance model 316 determines that one or more adverse situations that can impact the operation of the vehicle is occurring, the vehicle performance model 316 determines an adverse situation severity level associated with the one or more adverse situations. As a non-limiting example, the vehicle performance model 316 in some contexts classifies one or more adverse situations as having a low severity level, a moderate severity level, a high severity level, a critical severity level, and/or the like. In various embodiments, one or more adverse situation severity thresholds in some contexts are determined and incorporated by the vehicle performance prediction model 314 such that when a respective adverse situation severity level associated with the one or more adverse situations satisfies the one or more adverse situation severity thresholds, the vehicle performance prediction model 314 generates one or more recommendations to address the one or more adverse situations.

As a non-limiting example, in response to determining that an adverse situation associated with a moderate severity level is impacting the operation of the vehicle (e.g., one or more battery cells associated with the battery system is beginning to overheat), the vehicle performance prediction model 314 may generate a recommendation to cause the vehicle to execute an emergency navigation procedure that navigates the vehicle to an optimal travel hub via an optimal route.

As another non-limiting example, in response to determining that an adverse situation associated with a high severity level is impacting the operation of the vehicle (e.g., a failure of a particular vehicle system), the vehicle performance prediction model 314 may generate a recommendation to cause the vehicle to execute an emergency navigation procedure that navigates the vehicle to a nearest candidate travel hub.

As another non-limiting example, in response to determining that an adverse situation associated with a low severity level is impacting the operation of the vehicle (e.g., one or more battery cells associated with the battery system is discharging at an unexpected rate), the vehicle performance prediction model 314 may generate a recommendation to switch the vehicle into an alternate, energy-conserving operational mode and continue to execute the current trip plan by following the route associated with the predicted energy visualization.

The vehicle performance model 316 in some contexts determines a respective adverse situation type associated with one or more adverse situations impacting the operation of the vehicle. One or more adverse situation types in some contexts are determined based in part on one or more portions of vehicle performance data indicative of a nominal scenario, an emergency scenario, a hazard scenario, a scenario that alters the voyage of the aerial vehicle, and/or a change in the operation of a system affecting control of the aerial vehicle. In various embodiments, at least a portion of the vehicle performance data is based at least in part on vehicle sensor data collected, measured, calculated, and/or otherwise generated by one or more sensors (e.g., one or more sensors 210) associated with the vehicle.

A few non-limiting examples of adverse situation types that in some contexts is associated with a respective adverse situation include, an emergency adverse situation type, a hazard adverse situation type, a mechanical failure adverse situation type, a logistical adverse situation type, an environmental adverse situation type, an optimization adverse situation type, a personnel health adverse situation type, and/or the like. In some embodiments, adverse situation types in some contexts are associated with a predefined adverse situation severity level. For example, in some embodiments, a logistical adverse situation type in some contexts is automatically associated with a low severity level. However, the vehicle performance model 316 in some contexts determines that a particular adverse situation associated with a logistical adverse situation type has a high adverse situation severity level due to various respective circumstances.

The vehicle performance model 316 is configured to cause rendering of one or more portions of data related to the current state of a vehicle (e.g., the vehicle 112) via, for example, the vehicle apparatus 200 and/or the RVOH apparatus 318. For example, the vehicle performance model 316 is configured to cause rendering of one or more portions of data related to a state of the vehicle, data related to the one or more adverse situations impacting the operation of the vehicle, data related to the vehicle performance data associated with the vehicle, data related to the vehicle sensor data associated with the vehicle, and/or the like.

Furthermore, the vehicle performance model 316 is configured to generate one or more alerts, warnings, notifications, and/or prompts related to the one or more portions of data related to the current state of a vehicle (e.g., the vehicle 112). The vehicle performance model 316 cause rendering of the one or more alerts, warnings, notifications, and/or prompts via, for example, the vehicle apparatus 200 and/or the RVOH apparatus 318. The one or more alerts, warnings, notifications, and/or prompts, in some contexts, detail the state of the vehicle, one or more adverse situations impacting the operation of the vehicle, and/or the one or more vehicle systems (e.g., vehicle onboard systems 102) that have been affected by the one or more adverse situations. In various contexts, the vehicle performance model 316 causes rendering of the one or more alerts, warnings, notifications, and/or prompts via remote vehicle operation interface associated with one or more electronic displays associated with the RVOH apparatus 318. Additionally or alternatively, the vehicle performance model 316 in some contexts causes rendering of the one or more alerts, warnings, notifications, and/or prompts via the vehicle apparatus 200.

The vehicle performance model 316 is also configured to transmit data related to one or more portions of vehicle performance data, data related to one or more adverse situations, and/or data related to one or more states of the vehicle to the vehicle performance prediction model 314 comprised within the performance prediction system 312 to facilitate the mitigation of one or more adverse situations impacting the corresponding vehicle (e.g., the vehicle 112).

As shown in FIG. 3, in addition to the performance prediction system 312, the RVOH 310 also comprises the RVOH apparatus 318 and the datastore 320. The RVOH apparatus 318, in some contexts is a computing apparatus deployed in many configurations, the details of which will be provided in the description of FIG. 4 which illustrates the various components of the RVOH apparatus 318. The RVOH apparatus 318 is configured to generate one or more interactive user interfaces for rendering on one or more electronic displays associated with the RVOH 310. For example, in some embodiments, the RVOH apparatus 318 is configured to generate an interactive user interfaces and/or dashboards comprising various interactive interface elements representing data related to the VEM platform 300, data related to one or more onboard VEM systems 301, data related to one or more vehicles (e.g., one or more vehicles 112), data related to the one or more systems integrated with the RVOH 310, and/or data related to the one or more storage systems associated with the VEM platform 300. In various examples, the RVOH apparatus 318 is configured to generate a remote vehicle operation interface and/or one or more sub-interfaces associated with the remote vehicle operation interface such as, for example, a situation interface associated with a respective vehicle 112.

As such, the RVOH apparatus 318, via the one or more interactive user interfaces and/or dashboards, is configured to initialize, configure, update, modify, control and/or otherwise set up an onboard VEM system 301 associated with a particular vehicle (e.g., vehicle 112). Additionally or alternatively, the RVOH apparatus 318, via the one or more interactive user interfaces and/or dashboards, is configured to initialize, configure, update, modify, and/or otherwise set up one or more components associated with a particular onboard VEM system 301 such as, for example, the energy monitoring system 302, the electronic displays 306, and/or the onboard VEM datastore 308.

The datastore 320 associated with the RVOH 310 in some contexts is configured to store, retrieve, configure, modify, and/or otherwise manage one or more portions of data related to the VEM platform 300. For instance, the datastore 320, in some contexts, stores vehicle performance data, adverse situation data, vehicle operation data associated with one or more vehicles, and/or one or more portions of training data for training and/or re-training the various models associated with the onboard VEM system 301 (e.g., the vehicle performance prediction model 314 and/or the vehicle performance model 316). Additionally, the datastore 320 in some contexts stores one or more portions of data associated with the environment data systems 108 and/or the vehicle operation management systems 106.

As such, the one or more portions of data comprised in the datastore 320 can be used to train, re-train, and/or otherwise update one or more ML models comprised in the performance prediction system 312. In this way, the one or more ML models comprised in the performance prediction system 312 (e.g., a vehicle performance prediction model 314 and/or the vehicle performance model 316) can be iteratively trained such that the accuracy, efficiency, and/or performance of said ML models are increased over time. In various contexts, the one or more portions of aforementioned data comprised in the datastore 320 can be used (e.g., by the vehicle performance prediction model 314) to predict an energy expenditure of a particular vehicle (e.g., the vehicle 112) based at least in part on a respective trip plan to be executed by the particular vehicle.

Additionally or alternatively, the datastore 320 is configured to store and/or manage one or more portions of data related to one or more travel hubs, one or more travel routes, one or more flight phases, one or more waypoints, one or more destinations, one or more locations, one or more environmental features, one or more obstacles, and/or one or more portions of logistical information that may impact, aid, facilitate, enhance, and/or otherwise pertain to one or more trip plans associated with one or more respective vehicles associated with the VEM platform 300.

Furthermore, the datastore 320 is configured to store one or more portions of data related to one or more vehicles associated with a vehicle fleet related to the VEM platform 300. For example, the datastore 320 in some contexts stores one or more vehicle profiles, vehicle identifiers, vehicle load identifiers, vehicle component identifiers, onboard VEM system identifiers, vehicle fleet data, vehicle mission data, and/or any other data pertinent to the one or more vehicles in a vehicle fleet associated with the VEM platform 300. Additionally, the datastore 320 can store one or more portions of personnel data related to one or more vehicle operators, vehicle pilots, vehicle crew members, ground crew members, management personnel, and/or passengers associated with the VEM platform 300. Additionally, the datastore 320, in various embodiments, is configured to store and/or manage one or more portions of data associated with the environment data systems 108 and/or the vehicle operation management systems 106. In various embodiments, the datastore 320 can be associated with the onboard VEM system 301 associated with the vehicle 112.

In various embodiments, the datastore 320 can be configured as cloud-based storage systems. As such, the one or more portions of data comprised in the datastore 320 can be accessed, retrieved, updated, and/or managed by the vehicle apparatus 200 via the network 110. Additionally or alternatively, in various embodiments, the one or more portions of data comprised in the datastore 320 can be accessed, retrieved, updated, and/or managed by the RVOH apparatus 318 via the network 110. Additionally or alternatively, the one or more portions of data comprised in the datastore 320 can, in various contexts, be stored locally in the vehicle apparatus 200 and/or the RVOH apparatus 318.

Figure 4:
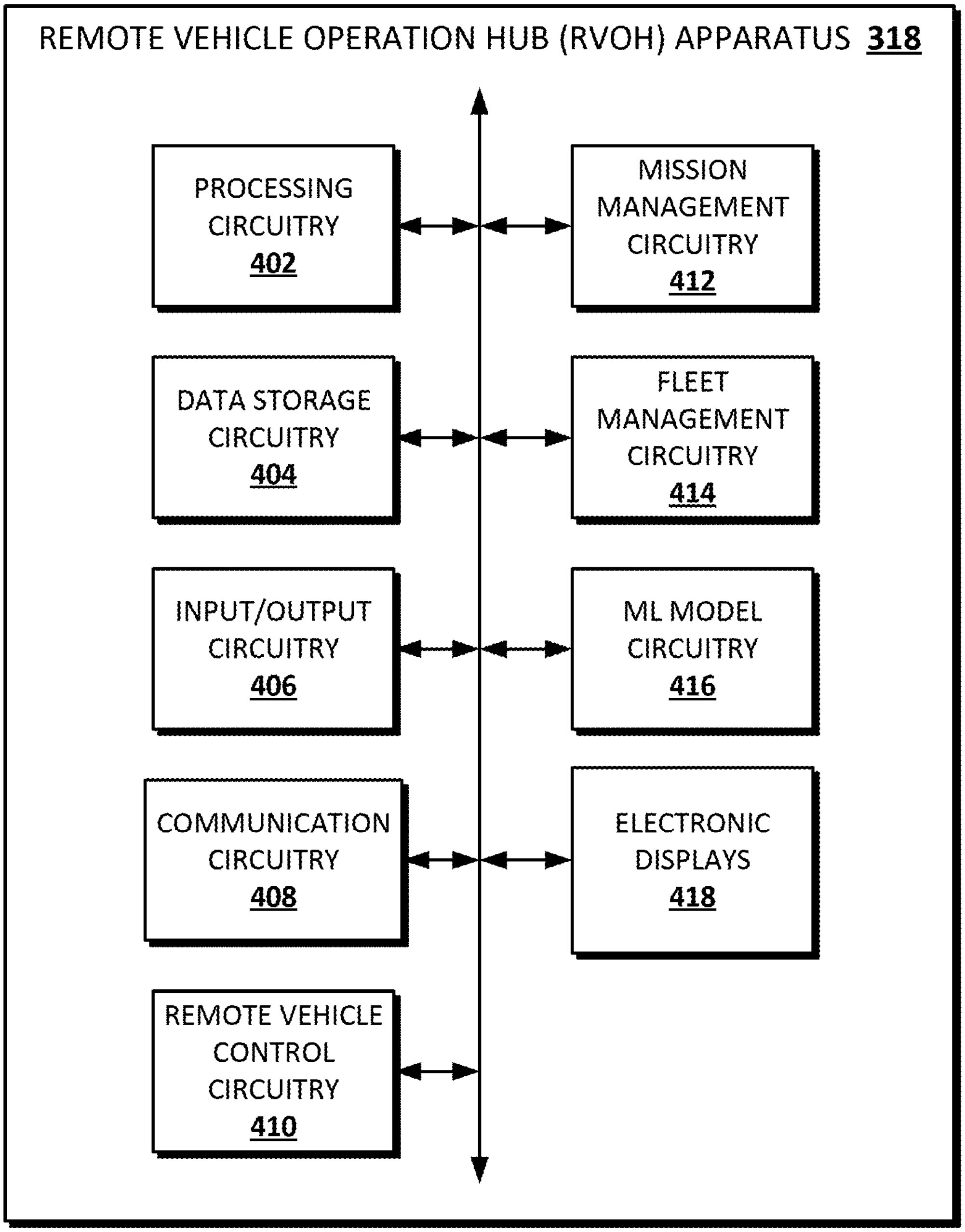
FIG. 4 illustrates an example remote vehicle operation hub (RVOH) apparatus in accordance with at least some example embodiments of the present disclosure.

FIG. 4 illustrates an example RVOH apparatus 318 associated with the RVOH 310 in accordance with at least some example embodiments of the present disclosure. As depicted in FIG. 4, the RVOH apparatus 318 comprises processing circuitry 402, data storage circuitry 404, input/output circuitry 406, communication circuitry 408, remote vehicle control circuitry 410, mission management circuitry 412, fleet management circuitry 414, ML model circuitry 416, and/or one or more electronic displays 418. In some embodiments, other elements of the RVOH apparatus 318 provide or supplement the functionality of another particular set of circuitry. For example, the processing circuitry 402 in some embodiments provides processing functionality to any of the other sets of circuitry, the data storage circuitry 404 provides storage functionality to any of other the sets of circuitry, the communication circuitry 408 provides network interface functionality to any of the other sets of circuitry, and/or the like. Additionally or alternatively, in various embodiments, the RVOH apparatus 318 is configured to control, configure, and/or otherwise operate one or more of the circuitries 202-214 of the vehicle apparatus 200 illustrated in FIG. 2 via the network 110. Additionally or alternatively, the RVOH apparatus 318 is configured to control, configure, and/or otherwise operate the one or more vehicle onboard systems 102 associated with a vehicle (e.g., the vehicle 112), as well as the other connected vehicle systems 104.

In some embodiments, the processing circuitry 402 (and/or co-processor or any other processing circuitry assisting or otherwise associated with the processor) is/are in communication with the data storage circuitry 404 via a bus for passing information among components of the RVOH apparatus 318. In some embodiments, for example, the data storage circuitry 404 is non-transitory and includes for example, one or more volatile and/or non-volatile memories. In other words, for example, the data storage circuitry 404 in some embodiments includes or embodies an electronic storage device (e.g., a computer readable storage medium). In some embodiments, the data storage circuitry 404 is configured to store information, data, content, applications, instructions, or the like, for enabling the RVOH apparatus 318 to carry out various functions in accordance with example embodiments of the present disclosure. In various embodiments, the data storage circuitry 404 is configured to access, retrieve, store, delete, and/or otherwise manage one or more portions of data in the onboard VEM datastore 308, the onboard VEM datastore 308, and/or the datastore 320.

In various embodiments, the processing circuitry 402 is embodied in a number of different ways. For example, in some example embodiments, the processing circuitry 402 includes one or more processing devices configured to perform independently. Additionally or alternatively, in some embodiments, the processing circuitry 402 includes one or more processors configured in tandem via a bus to enable independent execution of instructions, pipelining, and/or multithreading. The use of the terms "processor" and "processing circuitry" should be understood to include a single core processor, a multi-core processor, multiple processors internal to the RVOH apparatus 318, and/or one or more remote or "cloud" processors external to the RVOH apparatus 318.

In an example embodiment, the processing circuitry 402 is configured to execute instructions stored in the data storage circuitry 404 or otherwise accessible to the processing circuitry 402. Additionally or alternatively, the processing circuitry 402 in some embodiments is configured to execute hard-coded functionality. As such, whether configured by hardware or software methods, or by a combination thereof, the processing circuitry 402 represents an entity (e.g., physically embodied in circuitry) capable of performing operations according to an embodiment of the present disclosure while configured accordingly. Additionally or alternatively, as another example in some example embodiments, when the processing circuitry 402 is embodied as an executor of software instructions, the instructions specifically configure the processing circuitry 402 to perform the algorithms embodied in the specific operations described herein when such instructions are executed.

As one particular example embodiment, the processing circuitry 402 is configured to perform various operations associated with responding to one or more requests received from a vehicle (e.g., requests generated via the onboard VEM system 301). In some embodiments, the processing circuitry 402 includes hardware, software, firmware, and/or a combination thereof, that receives data including one or more portions of vehicle performance data, vehicle sensor data, vehicle operation data, environmental data, logistical data, and/or data related to one or more adverse situations impacting the operation of the vehicle. Additionally or alternatively, in some embodiments, the processing circuitry 402 includes hardware, software, firmware, and/or a combination thereof, that causes rendering one or more recommendations generated by the vehicle performance prediction model 314 via one or more electronic interfaces associated with the RVOH apparatus 318 and/or one or more electronic interfaces associated with other computing devices related to the RVOH 310 and/or the VEM platform 300. Additionally or alternatively, in some embodiments, the processing circuitry 402 includes hardware, software, firmware, and/or a combination thereof, that in real-time updates rendering of a user interface and/or interface elements thereof in response to updated data related to the one or more adverse situations and/or one or more portions of data associated with the operation of the vehicle.

In some embodiments, RVOH apparatus 318 includes data storage circuitry 404 that is configured to store, update, retrieve, delete, and/or otherwise manage one or more portions of data associated with the onboard VEM datastore 308 and/or onboard VEM datastore 308 of the VEM platform 300, and/or the datastore 320 associated with the RVOH 310. As described herein, the data storage circuitry 404, in some contexts, stores and/or retrieves one or more computer program instructions associated with the one or more operations described herein. In various embodiments, the data storage circuitry 404 embodies, or integrates with, a server system, a cloud storage system, a collection of databases, one or more datastores, and/or any other type of non-transitory storage medium. In certain embodiments, the data storage circuitry 404 stores one or more portions of data obtained from the vehicle operation management systems 106 and/or the environment data systems 108, as well as any data related to any predicted energy expenditures, current energy expenditures, and/or adverse situations associated with the vehicle (e.g., the vehicle 112). Additionally, in some embodiments, the data storage circuitry 404 is configured to store, update, retrieve, delete, and/or otherwise maintain any training data associated with a vehicle performance prediction model 314 associated with the performance prediction system 312.

In some embodiments, RVOH apparatus 318 includes input/output circuitry 406 that provides output to the user and, in some embodiments, to receive an indication of a user input (e.g., user input generated by a remote operator, ground crew member, and/or the like). In some embodiments, the input/output circuitry 406 is in communication with the processing circuitry 402 to provide such functionality. The input/output circuitry 406 comprises one or more user interfaces and in some embodiments includes an electronic display that comprises the interfaces rendered as a web user interface, an application user interface, a user device, a backend system, or the like. In some embodiments, the input/output circuitry 406 also includes a keyboard, a mouse, a joystick, a touch screen, touch areas, soft keys a microphone, a speaker, or other input/output mechanisms. The processing circuitry 402, and/or input/output circuitry 406 comprising a processor, in some embodiments is configured to control one or more functions of one or more interface elements through computer program instructions (e.g., software and/or firmware) stored on a memory accessible to the processing circuitry 402 (e.g., data storage circuitry 404, and/or the like). In some embodiments, the input/output circuitry 406 includes or utilizes a user-facing application to provide input/output functionality to a computing device and/or other display associated with a user. In some embodiments, the input/output circuitry 406 includes a primary flight display and/or a multi-function display associated with a vehicle (e.g., a vehicle 112). Additionally or alternatively, in some embodiments, the input/output circuitry 406 includes one or more software-rendered user interfaces including interface elements that depict particular data and/or information, and/or that receive user input. Additionally or alternatively, in some embodiments, the input/output circuitry 406 embodies, integrates with, and/or is otherwise associated with one or more electronic displays 418.

The communication circuitry 408 includes any means such as a device or circuitry embodied in either hardware or a combination of hardware and software that is configured to receive and/or transmit data from/to a communications network and/or any other computing device, circuitry, or module in communication with the RVOH apparatus 318. In this regard, the communication circuitry 408 includes, for example in some embodiments, a network interface for enabling communications with a wired or wireless communications network. Additionally or alternatively in some embodiments, the communication circuitry 408 includes one or more network interface cards, antennas, buses, switches, routers, modems, and supporting hardware, firmware, and/or software, or any other device suitable for enabling communications via one or more communications networks (e.g., the network 110). Additionally or alternatively, the communication circuitry 408 includes circuitry for interacting with the antennas and/or other hardware or software to cause transmission of signals via the antennas or to handle receipt of signals received via the antennas. In some embodiments, the communication circuitry 408 enables transmission to and/or receipt of data from one or more computing devices and/or systems of other connected vehicle systems 104, vehicle operation management systems 106, and/or environment data systems 108, in communication with the RVOH apparatus 318.

The remote vehicle control circuitry 410 includes hardware, software, firmware, and/or a combination thereof, that supports functionality associated with navigating and/or controlling a vehicle (e.g., a vehicle 112) remotely from the RVOH 310. In some embodiments, remote vehicle control circuitry 410 controls and/or configures one or more of the vehicle onboard systems 102 associated with the vehicle. In some embodiments, remote vehicle control circuitry 410 includes hardware, software, firmware, and/or a combination thereof, that receives trip plan data (e.g., embodying a flight plan), location services data representing a location of the vehicle, and/or the like. Additionally or alternatively, in some embodiments, the remote vehicle control circuitry 410 includes hardware, software, firmware, and/or a combination thereof, that depicts interface elements representing at least a flight path or indication where the vehicle is currently travelling and/or should travel.

Additionally or alternatively, in some embodiments, the remote vehicle control circuitry 410 includes hardware, software, firmware, and/or a combination thereof, that autonomously controls one or more components of a vehicle (e.g., a vehicle 112). In some such embodiments, the remote vehicle control circuitry 410 autonomously controls one or more physical components of the vehicle to facilitate movement of the vehicle along a particular path. Additionally or alternatively, in some embodiments, the remote vehicle control circuitry 410 includes hardware, software, firmware, and/or a combination thereof, that semi-autonomously controls one or more components of a vehicle 112, for example where certain aspects of the operation of the vehicle are autonomously performed and others (e.g., directional control) is/are controlled by a user (e.g., a remote operator). Additionally or alternatively, in some embodiments, the remote vehicle control circuitry 410 includes hardware, software, firmware, and/or a combination thereof, that receives remote operator input for controlling one or more components of a vehicle, for example via vehicle flight controls to alter speed and/or direction of the vehicle. Additionally or alternatively, in some embodiments, the remote vehicle control circuitry 410 includes hardware, software, firmware, and/or a combination thereof, that causes changes to an operational mode of a vehicle (e.g., a vehicle 112), for example autonomously based at least in part on one or more data-driven adverse situations and/or triggers, or in response to user input initiating the change in operational mode. It will be appreciated that, in some embodiments, the remote vehicle control circuitry 410 includes a separate processor, specially configured field programmable gate array (FPGA), or a specially programmed application specific integrated circuit (ASIC).

The mission management circuitry 412 includes hardware, software, firmware, and/or a combination thereof, that supports functionality associated with generating, receiving, configuring, and/or otherwise managing data related to the mission of one or more vehicles associated with the VEM platform 300. For example, the mission management circuitry 412 is configured to generate and/or manage one or more vehicle operation constraints associated with the operation of a vehicle. Vehicle operation constraints include, but are not limited to, constraints related to the configuration of one or more vehicle systems associated with the vehicle, constraints related to a trip plan (e.g., destinations, waypoints, flight paths, arrival/departure schedules and/or procedures, traffic management constraints, trip parameters, and/or the like), power consumption constraints (e.g., battery and/or fuel consumption thresholds), specific vehicle constraints (e.g., performance capabilities associated with one or more vehicle systems of the vehicle 112), environmental constraints (e.g., regulations related to operating a vehicle 112 in an urban environment), and/or the like. In various embodiments, the one or more vehicle operation constraints in some contexts are rendered via a respective electronic interface associated with the vehicle apparatus 200 and/or the RVOH apparatus 318.

Additionally, the mission management circuitry 412 includes hardware, software, firmware, and/or a combination thereof, that supports functionality associated with handling one or more logistical aspects of the one or more vehicles (e.g., the one or more vehicles 112) associated with the VEM platform 300. Non-limiting examples include monitoring the logistical aspects of one or more destinations (e.g., one or more travel hubs, airports, vertiports, etc.) associated with a trip plan of a vehicle (e.g., a vehicle 112). For example, the mission management circuitry 412 in some contexts monitors occupancy (e.g., available facilities to accommodate a vehicle 112) associated with a destination. Additionally or alternatively, the mission management circuitry 412 in some contexts determines logistical aspects related to potential destinations such as nearby health and safety services.

The fleet management circuitry 414 includes hardware, software, firmware, and/or a combination thereof, that supports functionality associated with the management of a fleet of vehicles (e.g., vehicles 112) associated with an enterprise related to the VEM platform 300. In various embodiments, the fleet management circuitry 414 includes hardware, software, firmware, and/or a combination thereof, that monitors the location, operational status, health, performance, and/or capabilities of one or more vehicles associated with the VEM platform 300. In this regard, the fleet management circuitry 414 generates one or more portions of fleet management data configured as model input for the vehicle performance prediction model 314.

The ML model circuitry 416 includes hardware, software, firmware, and/or a combination thereof, that supports functionality associated with the one or more ML models associated with the performance prediction system 312 such as, for example, the vehicle performance prediction model 314 and/or the vehicle performance model 316. For example, the ML model circuitry 416 executes, at least in part, one or more portions of program code associated with the methods and operations of the vehicle performance prediction model 314. For example, the ML model circuitry 416 includes hardware, software, firmware, and/or a combination thereof, that receives and/or analyzes one or more portions of model input comprising vehicle performance data, vehicle sensor data, vehicle operation data, vehicle system data, air traffic data, environmental data, logistical data, personnel data, and/or any other relevant data related to a particular vehicle (e.g., a particular vehicle 112). One or more portions of vehicle performance data is, in some contexts, generated in part by one or more components of the vehicle, one or more components of the RVOH apparatus 318, and/or one or more of the environment data systems 108 and the vehicle operation management systems 106 associated with the RVOH 310.

Additionally, in various embodiments, the ML model circuitry 416 includes hardware, software, firmware, and/or a combination thereof, that in some contexts is employed to train and/or retrain the vehicle performance prediction model 314 and/or the vehicle performance model 316 based at least in part on one or more portions of adverse situation data and/or prior model input comprising one or more prior adverse situations, one or more prior portions of prior vehicle performance data, one or more portions of prior vehicle sensor data, one or more prior operator inputs, and/or one or more prior vehicle operation constraints. In various embodiments, the ML model circuitry 416 is configured to facilitate the training and/or retraining of the vehicle performance prediction model 314 and/or the vehicle performance model 316 based in part on a pre-defined schedule such as, for example, daily, weekly, bi-weekly, monthly, and/or the like. In this regard, the ML model circuitry 416 includes hardware, software, firmware, and/or a combination thereof, that causes the storage, updating, retrieval, and/or the deletion of one or more portions of data associated with the vehicle performance prediction model 314.

The electronic displays 418 associated with the RVOH apparatus 318 may comprise, in various contexts, one or more displays associated with a cockpit of a vehicle (e.g., a vehicle 112), one or more vertical situation displays (VSDs), one or more PFDs, one or more displays associated with an FMS, one or more displays associated with a navigation system, one or more displays associated with one or more respective LRUs, one or more computer displays, and/or the like. The electronic displays 418 are configured to display one or more portions of data related to the energy expenditure of a vehicle (e.g., a vehicle 112), one or more portions of data related to a predicted energy expenditure of the vehicle (e.g., the vehicle 112), and/or one or more portions of data related to one or more adverse situations impacting the operation of the vehicle (e.g., the vehicle 112). In various contexts, the one or more electronic displays 418 can be associated with one or more computing devices and/or data storage systems associated with the RVOH 310.

It will be appreciated that, further in some embodiments, two or more of the sets of circuitries 402-418 are combinable. Additionally or alternatively, in some embodiments, one or more of the sets of circuitry 402-418 perform some or all of the functionality described associated with another component. For example, in some embodiments, one or more of the sets of circuitry 402-418 are combined into a single component embodied in hardware, software, firmware, and/or a combination thereof. For example, in some embodiments, two or more of the remote vehicle control circuitry 410 and ML model circuitry 416 are embodied by a single set of circuitry that performs the combined operations of the individual sets of circuitry. Similarly, in some embodiments, one or more of the sets of circuitry, for example remote vehicle control circuitry 410 and/or ML model circuitry 416 is/are combined with the processing circuitry 402, such that the processing circuitry 402 performs one or more of the operations described above with respect to each of these other sets of circuitry.

Operational Examples of Various Embodiments of the Disclosure

Figure 5:
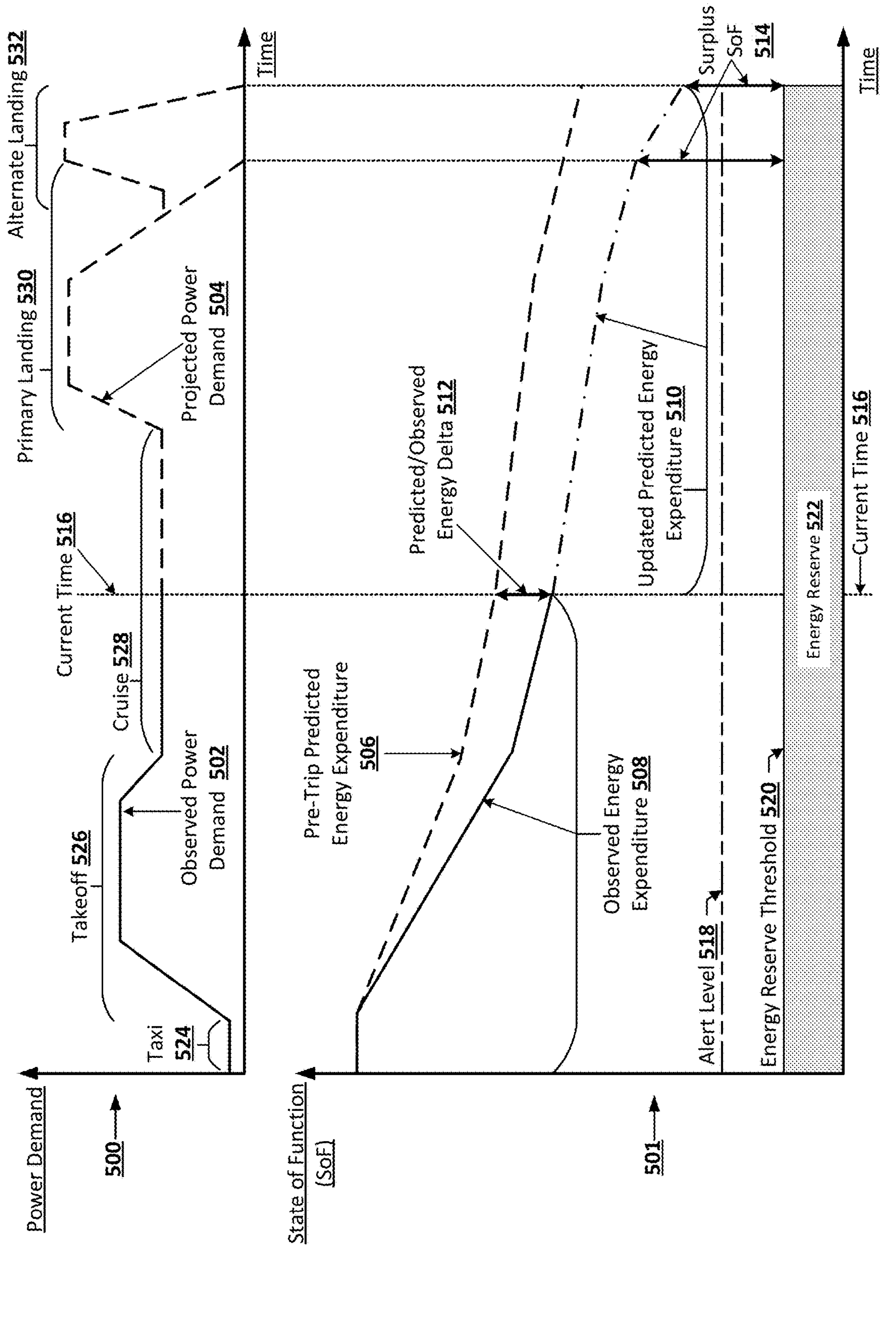
FIG. 5 illustrates an example graphical representation of a predicted energy expenditure versus an observed energy expenditure relative to a projected power demand associated with various flight phases of a trip plan being executed by a vehicle in accordance with at least some example embodiments of the present disclosure.

FIG. 5 illustrates an example graphical representation of a predicted energy expenditure versus an observed energy expenditure relative to a projected power demand associated with various flight phases of a trip plan being executed by a vehicle in accordance with at least some example embodiments of the present disclosure. The graphical representation employs a graph 500 and a graph 501, where graph 500 describes the power demand related to various flight phases 524-532 related to a trip plan associated with a vehicle, and graph 501 describes the state of function (SoF) of a battery system of the vehicle according to various energy expenditures of the vehicle over the course of the trip plan.

The graphs 500 and 501 are correlated such that the various energy expenditures described in graph 501 align with the various flight phases 524-532 described in graph 500 over a time period associated with a particular trip plan. In various embodiments, the graphs 500 and 501 illustrated in FIG. 5 may be generated by the performance prediction system 312. Additionally, in various examples, the graphs 500 and 501 may be rendered via a remote vehicle operation interface on an electronic display 418 associated with an RVOH apparatus 318, and/or one or more other computing devices associated with the vehicle energy monitoring (VEM) platform 300.

The graph 500 illustrates an observed power demand 502 and a projected power demand 504 associated to various flight phases 524-532 related to a particular trip plan being executed by a vehicle (e.g., a vehicle 112). As depicted in FIG. 5, the graph 500 describes that various respective flight phases 524-532 related to the trip plan may demand more power from the vehicle than others. For example, a takeoff flight phase 526 associated with a takeoff procedure performed by the vehicle may put a heavier load on an energy system associated with the vehicle than a cruise flight phase 528 and/or a taxi flight phase 524. Similarly, a primary landing flight phase 530 of the vehicle may put a heavier load on the energy system associated with the vehicle than the taxi flight phase 524, takeoff flight phase 526, and/or cruise flight phase 528.

As depicted in FIG. 5, both of the graphs 500 and 501 depict various observed measurements related to the power demands and/or the energy expenditure of the vehicle over time. For example, the observed power demand 502 represented by the solid line in graph 500 describes the power demanded of the energy system of the vehicle up until the current time 516 of the trip plan being executed. The projected power demand 504 represented by the dashed line in graph 500 describes the predicted power that will be demanded of the energy system of the vehicle for various upcoming flight phases related to the trip plan.

In various contexts, the various components of the performance prediction system 312 are configured to generate the observed power demand 502 and the projected power demand 504. For example, the projected power demand 504 may be generated based on data obtained and/or generated by the vehicle performance model 316. The projected power demand 504 may be generated and/or updated by the vehicle performance prediction model 314 based on the data related to the observed power demand 502. For example, the projected power demand 504 may be updated by the vehicle performance prediction model 314 throughout the execution of the trip plan such that the projected power demand 504 accounts for the power demands of the energy system of the vehicle that have been measured in real-time. In this manner, the projected power demand 504 is dynamically updated by the performance prediction system 312 in real-time or near-real-time (e.g., within a time interval to complete the processing and perform a data transmission upon completion of the processing) throughout the duration of the trip plan being executed by the vehicle.

As shown in FIG. 5, in various embodiments, the graph 500 may illustrate a projected power demand 504 related to both a primary landing flight phase 530 and an alternate landing flight phase 532. In various examples, the alternate landing flight phase 532 is associated with an alternate trip plan (e.g., a contingency trip plan) that the vehicle may execute in the event that an adverse situation impacts the projected operation of the vehicle.

In various embodiments, the graph 501 is configured to illustrate a pre-trip predicted energy expenditure 506, an observed energy expenditure 508, an updated predicted energy expenditure 510, a predicted/observed energy delta 512, one or more surplus SoFs 514, an alert level 518, an energy reserve threshold 520, and/or an energy reserve 522. In some examples, the pre-trip predicted energy expenditure 506 may be generated by the vehicle performance prediction model 314 based on a vehicle profile, the trip plan associated with the vehicle, and/or one or more environmental factors as part of a pre-trip validation process.

The observed energy expenditure 508 represented by the solid line in graph 501 describes the energy expended by the energy system of the vehicle up until the current time 516 of the trip plan being executed. The updated predicted energy expenditure 510 represented by the dashed line in graph 501 describes an updated energy expenditure prediction based on updated vehicle operation data collected in real-time. The updated vehicle operation data may comprise at least one portion of data associated with one or more factors affecting a current energy expenditure of the vehicle. For example, the updated vehicle operation data may comprise at least one of a current load on the vehicle battery system, the current energy expenditure, the observed energy expenditure 508, a current elevation of the vehicle, one or more upcoming flight phases 524-532, one or more current environmental factors, a current battery SoF, or a current operational health of one or more vehicle systems. In this manner, the updated predicted energy expenditure 510 is dynamically updated by the performance prediction system 312 in real-time or near-real-time throughout the duration of the trip plan being executed by the vehicle.

In various contexts, the various components of the performance prediction system 312 are configured to generate the observed energy expenditure 508 and the updated predicted energy expenditure 510. For example, the updated predicted energy expenditure 510 may be generated based on data obtained and/or generated by the vehicle performance model 316. The updated predicted energy expenditure 510 may be generated and/or updated by the vehicle performance prediction model 314 based on the data related to the observed energy expenditure 508. For example, the updated predicted energy expenditure 510 may be updated by the vehicle performance prediction model 314 throughout the execution of the trip plan such that the updated predicted energy expenditure 510 accounts for the energy expenditure of the vehicle that has been measured in real-time.

The predicted/observed energy delta 512 is highlighted in the graph 501 to describe the difference between the pre-trip predicted energy expenditure 506 and the observed energy expenditure 508. In various examples, the predicted/observed energy delta 512 can be used by the vehicle performance prediction model 314 to make accurate energy expenditure predictions for the remainder of a trip plan being executed. Additionally or alternatively, the predicted/observed energy delta 512 enables a pilot, crew member, remote operator and/or the like to quickly interpret the current and future performance of a vehicle as the vehicle executes a trip plan. Furthermore, the surplus SoFs 514 give a clear indication of an energy level of the vehicle that is projected to remain after the trip plan has been completely executed. In various examples, a surplus SoF 514 may be associated with a projected remaining energy level of a vehicle after executing a primary landing flight phase 530 associated with the trip plan. In various other examples, a surplus SoF 514 may be associated with a projected remaining energy level of a vehicle after executing an alternate landing flight phase 532 associated with the trip plan.

The graph 501 may be configured to display an alert level 518 and/or an energy reserve threshold 520 associated with a determined energy level associated with the vehicle. For example, an alert level 518 may correspond to a value equal to 30% of an available energy capacity of the battery system of the vehicle. Similarly, an energy reserve threshold 520 may correspond to an energy reserve value equal to 15% of an available energy capacity of the battery system of the vehicle. In various examples, the energy reserve threshold 520 and the corresponding energy reserve 522 are associated with a predefined energy reserve requirement associated with the vehicle. In various contexts, one or more vehicles associated with a respective VEM platform 300 may be configured to adhere to a predefined energy reserve requirement (e.g., an energy reserve requirement of 15%) regulating that a battery system of a respective vehicle must have a required amount of energy reserves relative to an available energy capacity of the battery system after arriving at a final destination associated with a particular trip plan.

In various examples, if a pre-trip predicted energy expenditure 506 and/or an updated predicted energy expenditure 510 satisfies (e.g., meets and/or falls below) an alert level 518 and/or an energy reserve threshold 520 associated with the vehicle, the performance prediction system 312 may generate and/or cause display of one or more alerts, notifications, warnings, and/or recommendations.

For example, if it is determined that a pre-trip predicted energy expenditure 506 and/or an updated predicted energy expenditure 510 will meet and/or fall below an alert level 518 and/or an energy reserve threshold 520, the performance prediction system 312 may generate and/or cause display of one or more recommendations on a remote vehicle operation interface rendered by the RVOH apparatus 318. In various examples, the one or more recommendations may comprise causing the vehicle to execute an alternate trip plan, revert to an originating travel hub wherefrom the trip plan was initiated, and/or perform an emergency landing. Furthermore, in various examples, the alert level 518 and/or the energy reserve threshold 520 may be associated with one or more respective vertical indicators displayed on a situation interface depicting an environment of the vehicle as the vehicle executes a trip plan.

Figure 6A:
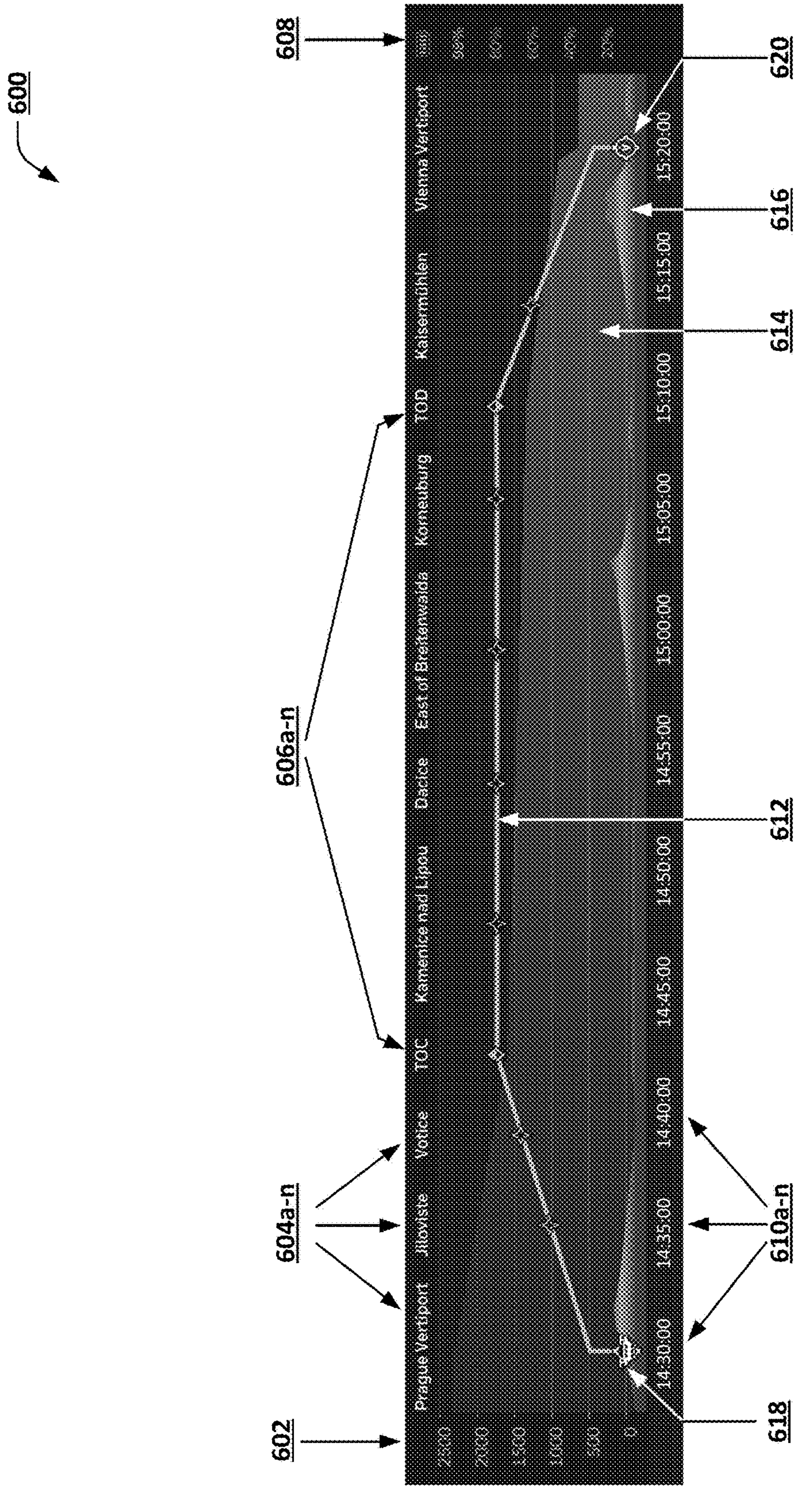
FIG. 6A illustrates an operational example of a situation interface configured to display, as part of a pre-trip validation process, a predicted energy visualization related to a predicted energy expenditure associated with a trip plan to be executed by a vehicle in accordance with at least some example embodiments of the present disclosure.

FIG. 6A illustrates an operational example of a situation interface 600 configured to display, as part of a pre-trip validation process, a predicted energy visualization related to a predicted energy expenditure associated with a trip plan to be executed by a vehicle (e.g., a vehicle 112) in accordance with at least some example embodiments of the present disclosure. In various embodiments, the situation interface 600 is a vertical situation interface. In some embodiments, the situation interface 600 is a sub-interface of a remote vehicle operation interface associated with one or more computing devices associated with the RVOH 310. In various other embodiments, the situation interface 600 is associated with a vertical situation display associated with a vehicle (e.g., an aerial vehicle).

As described herein, a performance prediction system 312 comprising the vehicle performance prediction model 314 may determine, as part of a pre-trip validation process, the predicted energy expenditure of a vehicle based on a vehicle profile, a trip plan associated with the vehicle, and/or one or more environmental factors. The vehicle profile may comprise data related to at least one of a vehicle type, a vehicle identifier, a vehicle battery system configuration, a number of passengers, and/or a vehicle payload weight.

Figure 6B:
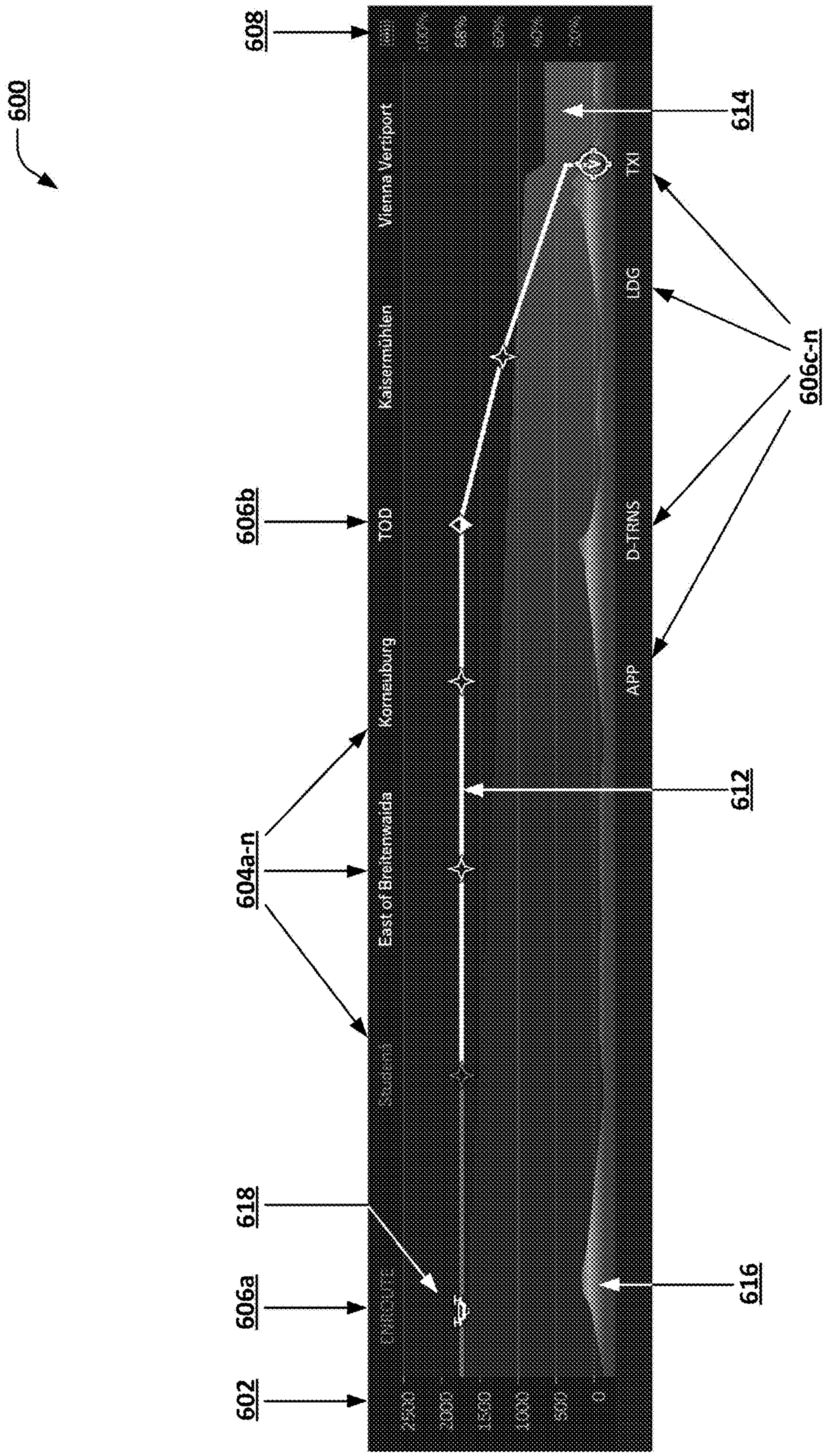
FIG. 6B illustrates an operational example of the situation interface configured to display a predicted energy visualization related to a predicted energy expenditure associated with a trip plan currently being executed by a vehicle in accordance with at least some example embodiments of the present disclosure.

The performance prediction system 312 can generate, based on the predicted energy expenditure determined during the pre-trip validation process, a predicted energy visualization 614 to be displayed on the situation interface 600. As shown in FIG. 6B, the situation interface 600 is configured to describe various information related to a trip plan associated with the vehicle. In various embodiments, the situation interface 600 may be configured to display an altitude axis 602, one or more waypoints 604*a-n* associated with a trip plan, one or more flight phases 606*a-n* associated with the trip plan, a current energy level axis 608, one or more timestamps 610*a-n* associated with the trip plan, a trip route 612 associated with the trip plan, the predicted energy visualization 614, a terrain profile 616 associated with an environment of the vehicle, a current location 618 of the vehicle, and/or a final destination 620 associated with the trip plan.

In various contexts, the situation interface 600 is configured to be dynamically updated in real-time or near-real-time during the execution of a trip plan by a respective vehicle. For example, in some contexts, the situation interface 600 is configured to be dynamically updated to display an updated predicted energy visualization 614 in relation to at least one defined leg between the plurality of flight phases in response to the vehicle performance prediction model 314 determining an updated predicted energy expenditure of the respective vehicle.

As illustrated in FIG. 6A, the predicted energy visualization 614 is displayed on a situation interface 600 oriented along a particular axis (e.g., an x-axis), in relation to at least one defined leg between the one or more flight phases 606*a-n*. The configuration of the predicted energy visualization 614 can indicate whether the vehicle has an available energy capacity to complete the trip plan. For example, as illustrated, the predicted energy visualization 614 shows that by the time the vehicle reaches the final destination 620 there will still be an acceptable surplus of energy remaining. This can be determined in part because the predicted energy visualization 614 goes well beyond the final destination 620 and corresponds to an acceptable energy level as indicated relative to the current energy level axis 608.

In various embodiments, the current energy level axis 608 can indicate the current energy level of the vehicle by highlighting, coloring, and/or otherwise calling attention to a particular percentage value listed on the current energy level axis 608. Additionally, in various embodiments, the level (e.g., the relative height) of the predicted energy visualization 614 can be measured by comparison to the current energy level axis 608. For example, as shown in FIG. 6A, at the beginning of the trip plan the predicted energy visualization 614 corresponds to a level equal to the current energy level of the vehicle (e.g., 98%). As the vehicle is predicted to expend energy over the course of the trip plan, the predicted energy visualization 614 changes in shape (e.g., reduces in height) based on the predicted energy expenditure of the vehicle. It can be derived from the predicted energy visualization 614 depicted in FIG. 6A that the vehicle will have an energy level of just below 40% by the time the vehicle reaches the final destination 620.

The situation interface 600 is configured to offer myriad insights related to the predicted energy expenditure of a vehicle over the course of a trip plan. For example, the trip route 612 is charted on the situation interface 600 with reference to the one or more waypoints 604*a-n* and/or the one or more flight phases 606*a-n* associated with the trip plan. As such, the predicted energy expenditure related to the various travel legs between flight phases 606*a-n* and/or waypoints 604*a-n* can be ascertained via a comparison between the predicted energy visualization 614 and the various points charted along the trip route 612.

Furthermore, in various embodiments, one or more timestamps 610*a-n* are displayed on an axis of the situation interface 600 relative to the one or more waypoints 604*a-n* and/or one or more flight phases 606*a-n* associated with the trip plan. In some embodiments, the timestamps 610*a-n* directly correspond to one or more respective waypoints 604*a-n* and/or one or more respective flight phases 606*a-n* associated with the trip plan. In other embodiments, the one or more timestamps 610*a-n* are displayed at regular intervals on the situation interface 600. In this regard, a predicted energy expenditure can be determined for a particular time during the execution of the trip plan via a comparison of the predicted energy visualization 614 and the one or more timestamps 610*a-n*.

The situation interface 600 is also configured to display vital information that may impact the safety of a vehicle during the execution of a particular trip plan. For example, the altitude axis 602 and the terrain profile 616 can be used to derive critical information related to the location of the vehicle during certain points of the trip plan. The situation interface 600 can be used to indicate whether the planned elevation of the vehicle during the trip plan will allow the vehicle to maintain a safe distance from one or more physical features depicted by the terrain profile 616 related to the environment of the vehicle. Furthermore, situation interface 600 may be used to determine whether the predicted energy expenditure of the vehicle may reach unsafe levels (e.g., an energy reserve threshold) at a particular point in the trip plan for which the vehicle may be traveling in close proximity to one or more dangerous features related to the terrain profile 616 (e.g., one or more mountains, hills, structures, and/or the like).

FIG. 6B illustrates an operational example of the situation interface 600 configured to display the predicted energy visualization 614 related to a predicted energy expenditure associated with a trip plan currently being executed by a vehicle (e.g., a vehicle 112) in accordance with at least some example embodiments of the present disclosure. For example, based on the configuration of the situation interface 600, the current location 618 of the vehicle is shown relative to a flight phase 606*a* related to an enroute flight phase during the execution of a respective trip plan. The current energy level of the vehicle (e.g., 68% as shown) can be determined via the current energy level axis 608. Additionally, the predicted energy visualization 614 is shown relative to the one or more flight phases 606*b-n* that have been scheduled for the vehicle based on the respective trip plan.

As shown in FIG. 6B, in various embodiments, the one or more upcoming waypoints 604*a-n* and/or one or more current and/or upcoming flight phases 606*a-n* may be highlighted, colored, and/or otherwise prioritized based on the current location 618 of the vehicle. For example, as depicted in FIG. 6B, a next waypoint 604*a* and a current travel leg associated with the trip route 612 leading to the next waypoint 604*a* may be colored differently than the other upcoming waypoints 604*b-c* and/or upcoming flight phases 606*b-n*. Similarly, a current flight phase (e.g., flight phases 606*a*) may be highlighted, colored, and/or otherwise prioritized relative to the one or more upcoming flight phases 606*b-n* associated with the trip plan.

As described herein, the vehicle performance prediction model 314 can dynamically update the predicted energy expenditure of the vehicle in real-time or near-real-time based on updated vehicle operation data collected in real-time during the execution of a particular trip plan. The updated vehicle operation data may comprise at least one portion of data associated with one or more factors affecting a current energy expenditure of the vehicle. For example, the updated vehicle operation data may comprise at least one of a current load on the vehicle battery system, the current energy expenditure, a current elevation of the vehicle (e.g., as indicated via the altitude axis 602), one or more upcoming flight phases (e.g., flight phases 606*a-n*), one or more current environmental factors, a current battery SoF (e.g., as indicated via the current energy level axis 608), or a current operational health of one or more vehicle systems. As such, the RVOH apparatus 318 is configured to display a dynamically updated predicted energy visualization 614 on the situation interface 600 based on the updated predicted energy expenditure in real-time or near-real-time.

Figure 7A:
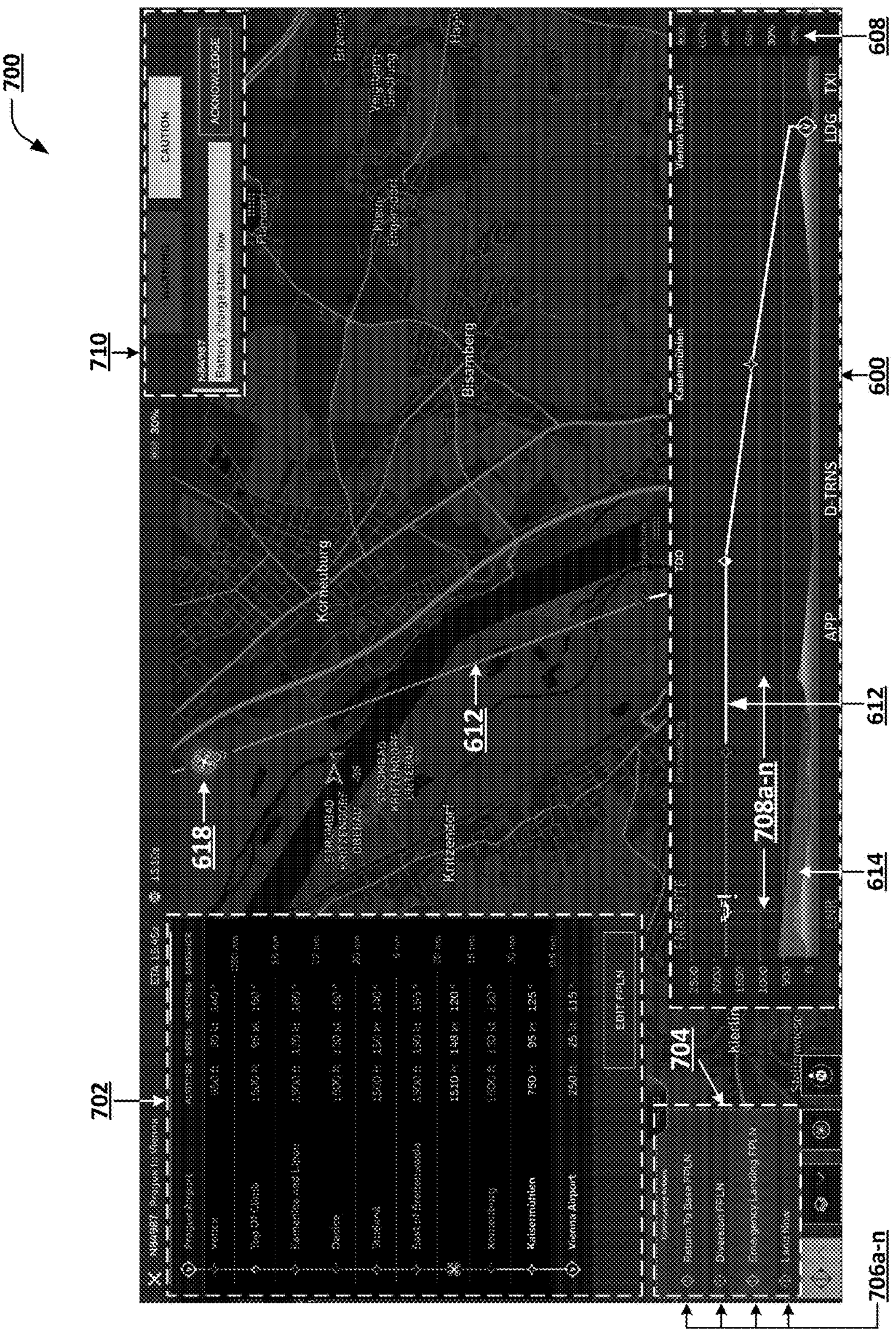
FIG. 7A illustrates an operational example of a remote vehicle operation interface configured to display various sub-interfaces configured to mitigate an adverse situation impacting the operation of a vehicle in accordance with at least some example embodiments of the present disclosure.

FIG. 7A illustrates an operational example of a remote vehicle operation interface 700 configured to display various sub-interfaces configured to mitigate an adverse situation impacting the operation of a vehicle (e.g., a vehicle 112) in accordance with at least some example embodiments of the present disclosure. As depicted, a situation interface 600 may be a sub-interface of a remote vehicle operation interface 700 generated by an RVOH apparatus 318. In various examples, the remote vehicle operation interface 700 may comprise a plurality of sub-interfaces including, but not limited to, the situation interface 600, a trip plan manager interface 702, a recommendation interface 704, and/or an alert interface 710. In addition to the plurality of sub-interfaces, the remote vehicle operation interface 700 may be configured to display a movable map related to the environment associated with the current location 618 of the vehicle. In various contexts, the movable map may be configured in an overhead perspective relative to the vehicle and may depict the trip route 612 associated with the current trip plan being executed by the vehicle.

In various embodiments, the trip plan manager interface 702 is configured to display various data related to the waypoints (e.g., waypoints 604*a-n*) and/or flight phases (e.g., flight phases 606*a-n*) associated with a trip plan being executed by a vehicle. The trip plan manager interface 702 may display, for each of the waypoints, data related to an observed or projected altitude of the vehicle, speed of the vehicle, heading of the vehicle, and/or distance between consecutive waypoints. Furthermore, in some embodiments, the trip plan manager interface 702 may be used to edit, update, and/or otherwise adjust a current trip plan or a future trip plan (e.g., an alternate trip plan) associated with the vehicle.

As shown in FIG. 7A, if it is determined via the vehicle performance prediction model 314 that the predicted energy expenditure of a vehicle may satisfy (e.g., meet, exceed, and/or fall short of) one or more energy level thresholds, the predicted energy visualization 614 associated with one or more travel legs yet to be covered by the vehicle may be shown in various colors corresponding to the one or more energy level thresholds. For example, if the predicted energy expenditure falls below a first energy level threshold (e.g., an SoC of 35%) the predicted energy visualization 614 may be shown in yellow until the predicted energy expenditure of the vehicle reaches a point (e.g., a respective flight phase 606*a-n* and/or waypoint 604*a-n*) in the trip plan associated with an energy reserve threshold (e.g., energy reserve threshold 520) associated with the predefined energy reserve requirement (e.g., an energy reserve requirement of 15%). The predicted energy visualization 614 associated with any travel legs, flight phases 606-*n*, and/or waypoints 604*a-n* associated with a predicted energy expenditure falling below the predefined energy reserve requirement (e.g., the energy reserve requirement of 15%) may be colored red.

Additionally or alternatively, the vehicle performance prediction model 314, in conjunction with the RVOH apparatus 318, is configured to generate one or more vertical indicators 708-*a-n* to be rendered on the situation interface 600 in relation to the trip route 612 plotted along the at least one axis of the situation interface 600. In some examples, the one or more vertical indicators 708*a-n* may be associated with the particular point along the trip route 612 for which the predicted energy expenditure of the vehicle is projected to reach the one or more energy level thresholds. For example, in various contexts, the one or more vertical indicators 708*a-n* may be associated with an alert level 518 and/or an energy reserve threshold 520. Additionally or alternatively, in various examples, the one or more vertical indicators 708*a-n* rendered on the situation interface 600 may be associated with a plurality of recommendations 706*a-n* generated by the vehicle performance prediction model 314 to mitigate one or more adverse situations impacting the operation of the vehicle.

In one or more embodiments, the RVOH apparatus 318 can display one or more recommendations 706*a-n* to mitigate one or more adverse situations in the recommendation interface 704. The one or more recommendations 706*a-n* may be configured to be selectable via a pilot, crew member, and/or remote operator associated with the vehicle. As described herein, the vehicle performance prediction model 314 in some contexts determines which recommendations of the one or more recommendations 706*a-n* will have the greatest positive effect on a current adverse situation impacting the operation of a vehicle. For example, in some embodiments, the vehicle performance prediction model 314 ranks the one or more recommendations 706*a-n* based at least in part on a predicted result associated with the execution of the one or more recommendations 706*a-n*. For instance, a first recommendation 706*a* in some contexts is ranked higher relative to a second recommendation 706*b* based at least in part on a predicted result associated with the first recommendation 706*a*. Based on the ranking of the one or more recommendations 706*a-n*, the vehicle performance prediction model 314 may give a particular recommendation priority by highlighting, pre-selecting, and/or otherwise calling attention to the particular recommendation on the remote vehicle operation interface 700. For example, as shown in FIG. 7A, the recommendation 706*c* associated with an emergency landing flight plan is given priority by highlighting the display element related to the recommendation 706*c* on the remote vehicle operation interface 700.

Furthermore, when an adverse situation is detected by the performance prediction system 312, one or more alerts, notifications, warnings, and/or messages describing the adverse situation may be displayed via the alert interface 710 on the remote vehicle operation interface 700. In various embodiments, the alert interface 710 may be configured to display one or more commercial aviation safety team (CAST) messages associated with the adverse situation impacting the operation of the vehicle.

Figure 7B:
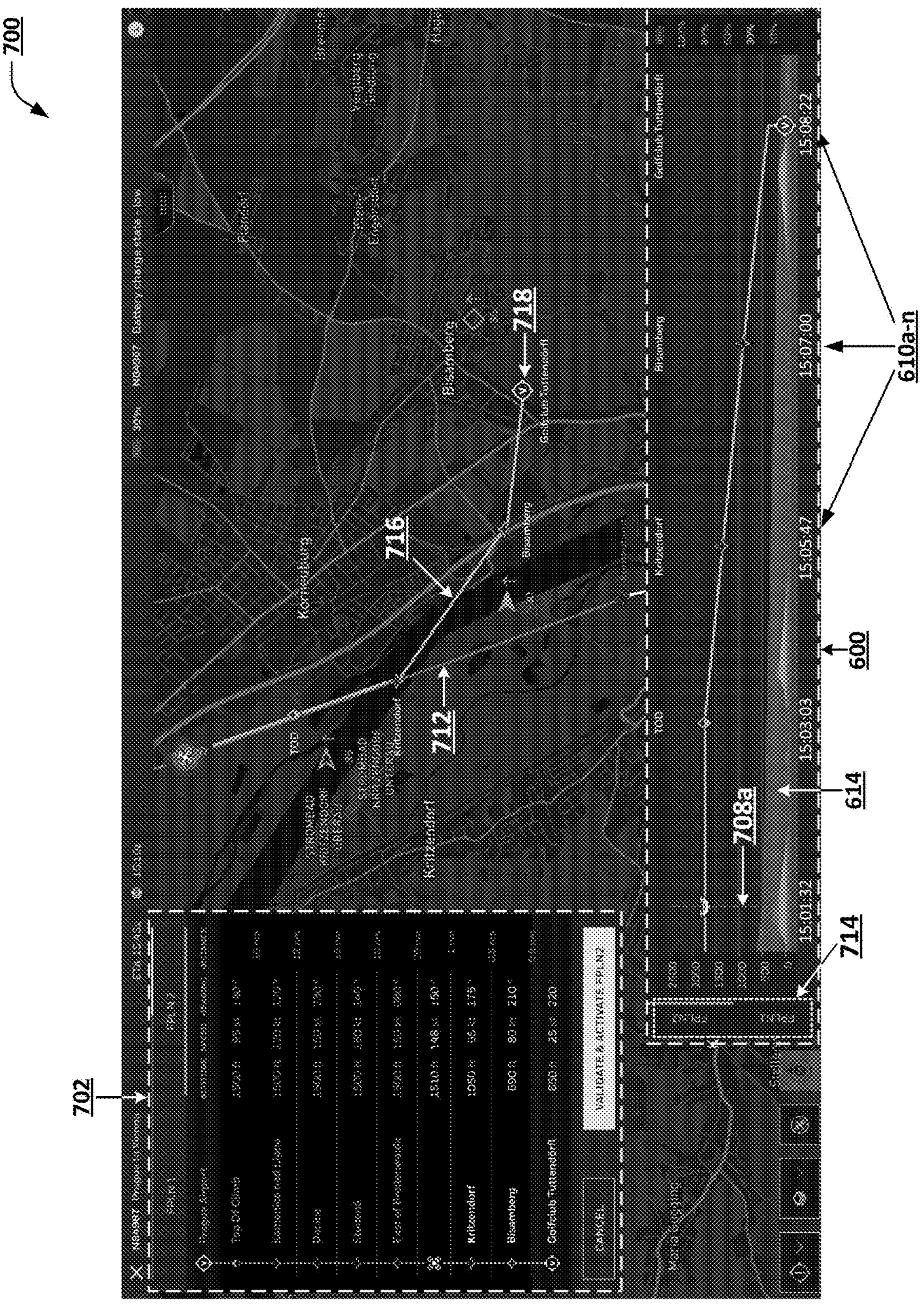
FIG. 7B illustrates an operational example of the remote vehicle operation interface 700 configured to display the predicted energy visualization associated with an alternate trip route related to an alternate trip plan for a vehicle in accordance with at least some example embodiments of the present disclosure.

FIG. 7B illustrates an operational example of the remote vehicle operation interface 700 configured to display the predicted energy visualization 614 associated with an alternate trip route 716 related to an alternate trip plan for a vehicle (e.g., a vehicle 112) in accordance with at least some example embodiments of the present disclosure. As described herein, the RVOH apparatus 318, in conjunction with the performance prediction system 312, can cause display, upon selection of a first recommendation (e.g., a recommendation 706*a*) of a plurality of recommendations, an alternate predicted energy visualization 614 associated with an alternate predicted energy expenditure based on a respective alternate trip plan on the situation interface 600. In such examples, the alternate predicted energy visualization 614 can be displayed via the situation interface 600 in relation to at least one defined leg between a plurality of flight phases (e.g., flight phases 606*a-n*) and/or timestamps (e.g., timestamps 610*a-n*) associated with the alternate trip plan.

Additionally, in various examples, a trip plan selection interface 714 displayed via the situation interface 600 may be used to switch between a trip plan currently being executed by a vehicle and the alternate trip plan associated with the first recommendation selected via the remote vehicle operation interface 700 (e.g., via a recommendation interface 704). Additionally, in such examples, the trip plan manager interface 702 may be configured to display various data related to the waypoints (e.g., waypoints 604*a-n*) and/or flight phases (e.g., flight phases 606*a-n*) associated with the alternate trip plan. Furthermore, in various examples, the trip plan manager interface 702 may be employed to select and/or initiate an alternate trip plan associated with a respective recommendation generated by the vehicle performance prediction model 314.

In various examples, when a recommendation associated with an alternate trip plan has been selected, an alternate trip route 716 associated with the alternate trip plan may be displayed on a moveable map rendered on the remote vehicle operation interface 700. Furthermore, an alternate final destination 718 associated with the alternate trip plan may also be displayed on the moveable map rendered on the remote vehicle operation interface 700.

Example Processes of the Disclosure

Having described example systems, apparatuses, data flows, user interfaces, and user interface elements in accordance with the present disclosure, example processes of the disclosure will now be discussed. It will be appreciated that each of the flowcharts depicts an example computer-implemented process that is performable by various means, including one or more of the apparatuses, systems, devices, and/or computer program products described herein, for example utilizing one or more of the specially configured components thereof.

It will be understood that each block of the processes, and combinations of blocks in the flowcharts, may be implemented by various means including hardware and/or a computer program product comprising one or more computer-readable mediums having computer-readable program instructions stored thereon. For example, one or more of the processes described herein in some embodiments is/are embodied by computer program of a computer program product. In this regard, the computer program products that embody the processes described herein in some embodiments comprise one or more non-transitory memory devices of a computing device, apparatus, and/or the like (for example, the memory 204 of the vehicle apparatus 200) storing instructions executable by a processor of a computing device (for example, by the processor 202 of the vehicle apparatus 200). In some embodiments, the computer program instructions of the computer program product that embody the processes are stored by non-transitory computer-readable storage mediums of a plurality of computing devices. It will be appreciated that any such computer program products may be loaded onto one or more computers and/or other programmable apparatuses (for example, a vehicle apparatus 200), such that the computer program product including the program code instructions that execute on the computers or other programmable apparatuses create means for implementing the functions specified in the operational blocks.

Further, in some embodiments, the computer program product includes one or more non-transitory computer-readable memories on which the computer program instructions are stored such that the one or more computer-readable memories can direct one or more computers and/or other programmable apparatuses to function in a particular manner, such that the computer program product comprises an article of manufacture that implements the functions specified in the operational blocks. Additionally or alternatively, in some embodiments, the computer program instructions of one or more computer program products are loaded onto computing devices or other programmable apparatuses to cause a series of operations to be performed on the computing devices or other programmable apparatuses a computer-implemented process such that the instructions that execute on the computing devices or other programmable apparatuses implement the functions specified in the operational blocks.

Each of the processes depicted includes a plurality of operational blocks defining a particular algorithm for performing one or more portions of functionality for generating and/or outputting improved user interfaces as described herein. The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted blocks in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 8:
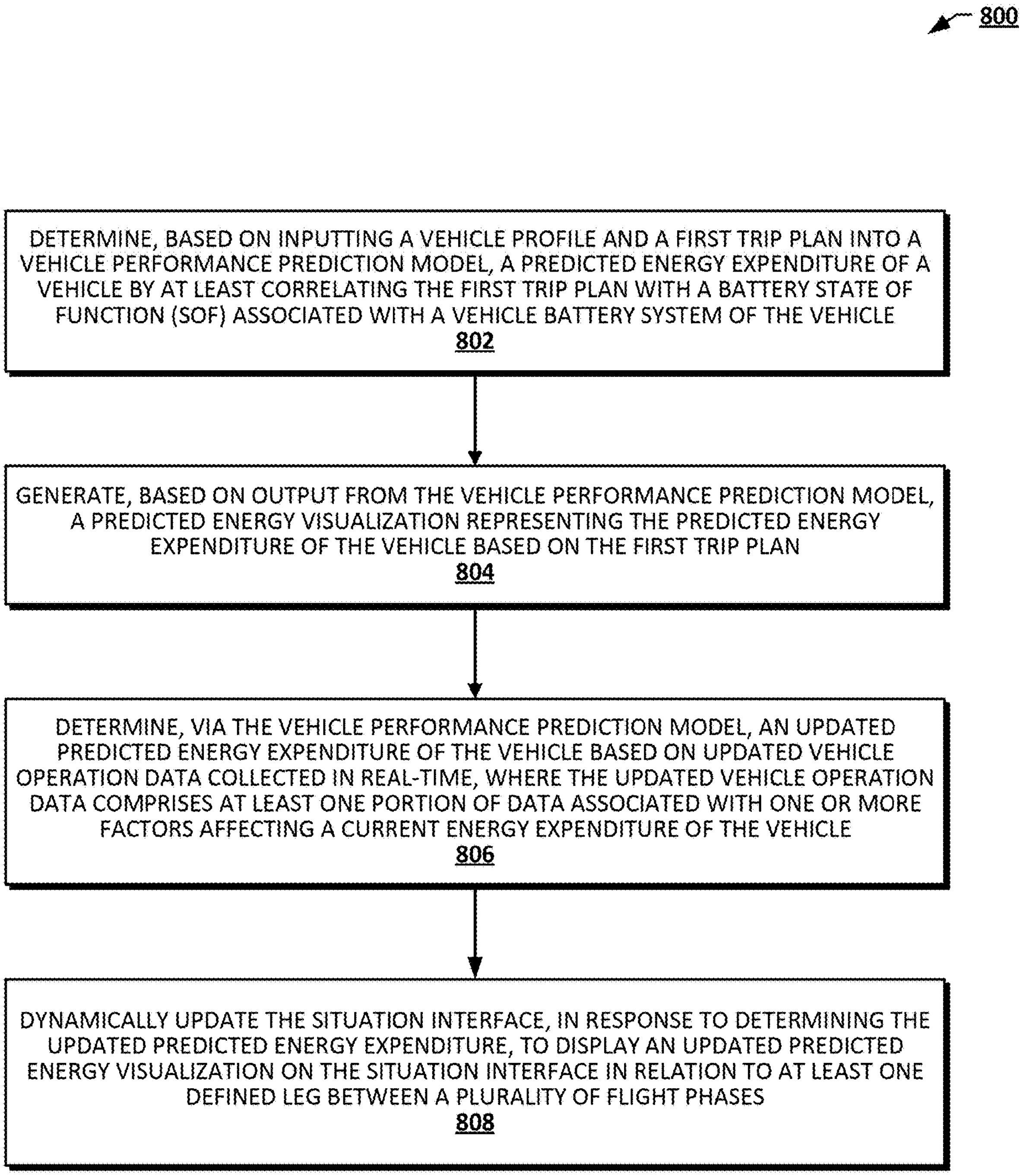
FIG. 8 illustrates a flowchart depicting example operations of an example process for providing enhanced vehicle energy monitoring for one or more vehicles associated with a VEM platform in accordance with at least some example embodiments of the present disclosure.

FIG. 8 illustrates a flowchart depicting example operations of an example process 1000 for providing enhanced vehicle energy monitoring for one or more vehicles associated with a VEM platform 300 in accordance with at least some example embodiments of the present disclosure. In some embodiments, the process 800 is embodied by a computer-implemented process executable by any of a myriad of computing devices, apparatuses, systems, and/or the like as described herein. Additionally or alternatively, in some embodiments, the process 800 is embodied by computer program code stored on a non-transitory computer-readable storage medium of a computer program product configured for execution to perform the process as depicted and described.

Additionally or alternatively, in some embodiments, the process 800 is performed by one or more specially configured computing devices, such as the RVOH apparatus 318 alone or in communication with one or more other components, devices, systems, and/or the like (e.g., such as the vehicle apparatus 200). In this regard, in some such embodiments, the RVOH apparatus 318 is specially configured by computer-coded instructions (e.g., computer program instructions) stored thereon, for example in the data storage circuitry 404 and/or another component depicted and/or described herein and/or otherwise accessible to the RVOH apparatus 318, for performing the operations as depicted and described.

In some embodiments, the RVOH apparatus 318 is in communication with one or more external apparatuses, systems, devices, and/or the like, to perform one or more of the operations as depicted and described. For example, the RVOH apparatus 318 in some embodiments is in communication with an end-user computing device, one or more external systems, and/or the like. It will be appreciated that while the process 1000 is described as performed by and from the perspective of the RVOH apparatus 318 for purposes of simplifying the description, the process 800 can also be performed, in total or in part, by the vehicle apparatus 200.

The process 800 begins at operation 802. At operation 802, the RVOH apparatus 318 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that determines, based on inputting a vehicle profile and a first trip plan into a vehicle performance prediction model 314, a predicted energy expenditure of a vehicle (e.g., a vehicle 112) by at least correlating the first trip plan with a battery state of function (SoF) associated with a vehicle battery system of the vehicle.

At operation 804, the RVOH apparatus 318 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that generates, based on output from the vehicle performance prediction model 314, a predicted energy visualization representing the predicted energy expenditure of the vehicle based on the first trip plan, where the predicted energy visualization corresponds to at least one defined leg between a plurality of flight phases associated with a first trip route of the first trip plan, where the predicted energy visualization is displayed on a situation interface in relation to the at least one defined leg between the plurality of flight phases, and where the predicted energy visualization is plotted along at least one axis of the situation interface representing a position along the first trip route.

At operation 806, the RVOH apparatus 318 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that determines, via the vehicle performance prediction model 314, an updated predicted energy expenditure of the vehicle based on updated vehicle operation data collected in real-time, where the updated vehicle operation data comprises at least one portion of data associated with one or more factors affecting a current energy expenditure of the vehicle.

At operation 808, the RVOH apparatus 318 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that dynamically updates the situation interface, in response to determining the updated predicted energy expenditure, to display an updated predicted energy visualization on the situation interface in relation to the at least one defined leg between the plurality of flight phases.

Figure 9:
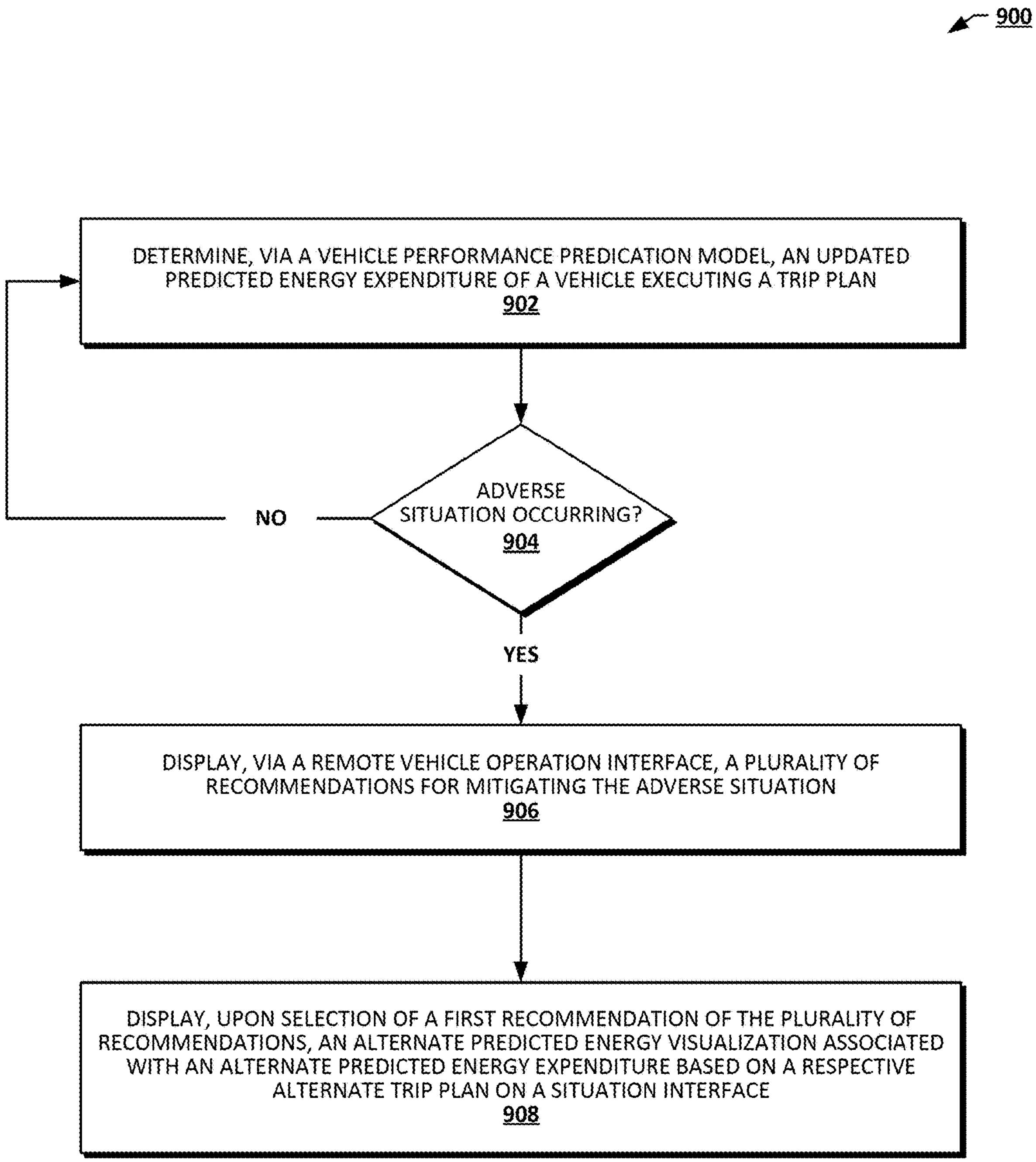
FIG. 9 illustrates a flowchart depicting example operations of an example process for mitigating an adverse situation impacting the operation of a vehicle in accordance with at least some example embodiments of the present disclosure.

FIG. 9 illustrates a flowchart depicting example operations of an example process 1100 for mitigating an adverse situation impacting the operation of a vehicle in accordance with at least some example embodiments of the present disclosure. In some embodiments, the process 900 is embodied by a computer-implemented process executable by any of a myriad of computing devices, apparatuses, systems, and/or the like as described herein. Additionally or alternatively, in some embodiments, the process 900 is embodied by computer program code stored on a non-transitory computer-readable storage medium of a computer program product configured for execution to perform the process as depicted and described.

Additionally or alternatively, in some embodiments, the process 900 is performed by one or more specially configured computing devices, such as the RVOH apparatus 318 alone or in communication with one or more other components, devices, systems, and/or the like (e.g., such as the vehicle apparatus 200). In this regard, in some such embodiments, the RVOH apparatus 318 is specially configured by computer-coded instructions (e.g., computer program instructions) stored thereon, for example in the data storage circuitry 404 and/or another component depicted and/or described herein and/or otherwise accessible to the RVOH apparatus 318, for performing the operations as depicted and described.

In some embodiments, the RVOH apparatus 318 is in communication with one or more external apparatuses, systems, devices, and/or the like, to perform one or more of the operations as depicted and described. For example, the RVOH apparatus 318 in some embodiments is in communication with an end-user computing device, one or more external systems, and/or the like. It will be appreciated that while the process 1100 is described as performed by and from the perspective of the RVOH apparatus 318 for purposes of simplifying the description, the process 900 can also be performed, in total or in part, by the vehicle apparatus 200.

The process 900 begins at operation 902. At operation 902, the RVOH apparatus 318 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that determines, via a vehicle performance predication model, an updated predicted energy expenditure of a vehicle executing a trip plan. At operation 904, the RVOH apparatus 318 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that determines, based on updating the predicted energy expenditure, that an adverse situation is occurring.

At operation 906, the RVOH apparatus 318 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that displays, via a remote vehicle operation interface, a plurality of recommendations for mitigating the adverse situation.

At operation 908, the RVOH apparatus 318 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that displays, upon selection of a first recommendation of the plurality of recommendations, an alternate predicted energy visualization associated with an alternate predicted energy expenditure based on a respective alternate trip plan on the situation interface, where the alternate predicted energy visualization is displayed in relation to at least one defined leg between a plurality of flight phases associated with the alternate trip plan.

Conclusion

While several example contexts are described herein with respect to processing of data by an aerial vehicle, it will be appreciated in view of this disclosure that embodiments may include or otherwise be implemented as a part of other vehicles, devices, and/or the like. For example, in other contexts, embodiments of the present disclosure utilize sensors of and/or display data to displays of other types of vehicles, including ground vehicles. Additionally or alternatively, some embodiments utilize sensors of and/or display data to displays of other devices, including user devices, back-end computing devices, and/or the like. Indeed, in some embodiments, the sensors, computing devices, and/or displays are embodied and/or otherwise included in one or more computing devices not integrated as part of any vehicle (e.g., as a standalone computing device). In is intended that all such contexts, device types, and/or the like be included within the scope of this disclosure and covered within the scope of the claims appended herein.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method, the computer-implemented method comprising:

determining, based on inputting a vehicle profile and a first trip plan into a vehicle performance prediction model, a predicted energy expenditure of a vehicle by at least correlating the first trip plan with a battery state of function (SoF) associated with a vehicle battery system of the vehicle;

generating, based on the predicted energy expenditure, a predicted energy visualization representing the predicted energy expenditure of the vehicle based on the first trip plan, wherein the predicted energy visualization corresponds to at least one defined leg between a plurality of flight phases associated with a first trip route of the first trip plan, wherein the predicted energy visualization is displayed on a situation interface oriented along a particular axis, in relation to the at least one defined leg between the plurality of flight phases, and wherein the predicted energy visualization is plotted along at least one axis of the situation interface representing a position along the first trip route;

determining, via the vehicle performance prediction model, an updated predicted energy expenditure of the vehicle based on updated vehicle operation data collected in real-time, wherein the updated vehicle operation data comprises at least one portion of data associated with one or more factors affecting a current energy expenditure of the vehicle; and dynamically updating the situation interface, in response to determining the updated predicted energy expenditure, to display an updated predicted energy visualization on the situation interface in relation to the at least one defined leg between the plurality of flight phases.

2. The computer-implemented method of claim 1, the computer-implemented method further comprising:

determining, based on determining the updated predicted energy expenditure, that an adverse situation is occurring;

in response to determining that the adverse situation is occurring:

displaying, via a remote vehicle operation interface, a plurality of recommendations for mitigating the adverse situation;

displaying, upon selection of a first recommendation of the plurality of recommendations, an alternate predicted energy visualization associated with an alternate predicted energy expenditure based on a respective alternate trip plan on the situation interface, wherein the alternate predicted energy visualization is displayed in relation to at least one defined leg between a plurality of flight phases associated with the alternate trip plan.

3. The computer-implemented method of claim 2, wherein each of the plurality of recommendations are associated with a respective criticality related to the adverse situation.

4. The computer-implemented method of claim 2, the computer-implemented method further comprising:

displaying, on the situation interface, at least one vertical indicator, wherein the at least one vertical indicator is associated with a specific point during the first trip plan in which a corresponding recommendation of the plurality of recommendations is to be executed.

5. The computer-implemented method of claim 2, wherein the situation interface is a sub-interface of the remote vehicle operation interface.

6. The computer-implemented method of claim 1, wherein the updated vehicle operation data comprises at least one of a current load on the vehicle battery system, the current energy expenditure, a current elevation of the vehicle, one or more upcoming flight phases, one or more current environmental factors, a current battery SoF, or a current operational health of one or more vehicle systems.

7. The computer-implemented method of claim 1, wherein the vehicle profile comprises at least one of a vehicle type, a vehicle identifier, a vehicle battery system configuration, a number of passengers, or a vehicle payload weight.

8. The computer-implemented method of claim 2, wherein determining that an adverse situation is occurring further comprises:

determining that the updated predicted energy expenditure will exceed an energy reserve threshold associated with an energy reserve value of the vehicle.

9. The computer-implemented method of claim 1, wherein the predicted energy visualization is characterized by at least one of a color-code, shading scheme, pattern, transparency, gradient, or a shape that is determined based on one or more predicted battery parameter values associated with the predicted energy expenditure.

10. An apparatus comprising:

at least one processor; and at least one non-transitory memory storing instructions that, when executed by the at least one processor, cause the apparatus to:

determine, based on inputting a vehicle profile and a first trip plan into a vehicle performance prediction model, a predicted energy expenditure of a vehicle by at least correlating the first trip plan with a battery state of function (SoF) associated with a vehicle battery system of the vehicle;

generate, based on the predicted energy expenditure, a predicted energy visualization representing the predicted energy expenditure of the vehicle based on the first trip plan, wherein the predicted energy visualization corresponds to at least one defined leg between a plurality of flight phases associated with a first trip route of the first trip plan, wherein the predicted energy visualization is displayed on a situation interface oriented along a particular axis, in relation to the at least one defined leg between the plurality of flight phases, and wherein the predicted energy visualization is plotted along at least one axis of the situation interface representing a position along the first trip route;

determine, via the vehicle performance prediction model, an updated predicted energy expenditure of the vehicle based on updated vehicle operation data collected in real-time, wherein the updated vehicle operation data comprises at least one portion of data associated with one or more factors affecting a current energy expenditure of the vehicle; and dynamically update the situation interface, in response to determining the updated predicted energy expenditure, to display an updated predicted energy visualization on the situation interface in relation to the at least one defined leg between the plurality of flight phases.

11. The apparatus of claim 10, wherein the instructions, when executed by the at least one processor, further cause the apparatus to:

determine, based on determine the updated predicted energy expenditure, that an adverse situation is occurring;

in response to determining that the adverse situation is occurring:

display, via a remote vehicle operation interface, a plurality of recommendations for mitigating the adverse situation;

display, upon selection of a first recommendation of the plurality of recommendations, an alternate predicted energy visualization associated with an alternate predicted energy expenditure based on a respective alternate trip plan on the situation interface, wherein the alternate predicted energy visualization is displayed in relation to at least one defined leg between a plurality of flight phases associated with the alternate trip plan.

12. The apparatus of claim 11, wherein each of the plurality of recommendations are associated with a respective criticality related to the adverse situation.

13. The apparatus of claim 11, wherein the instructions, when executed by the at least one processor, further cause the apparatus to:

display, on the situation interface, at least one vertical indicator, wherein the at least one vertical indicator is associated with a specific point during the first trip plan in which a corresponding recommendation of the plurality of recommendations is to be executed.

14. The apparatus of claim 11, wherein the situation interface is a sub-interface of the remote vehicle operation interface.

15. The apparatus of claim 10, wherein the updated vehicle operation data comprises at least one of a current load on the vehicle battery system, the current energy expenditure, a current elevation of the vehicle, one or more upcoming flight phases, one or more current environmental factors, a current battery SoF, or a current operational health of one or more vehicle systems.

16. The apparatus of claim 10, wherein the vehicle profile comprises at least one of a vehicle type, a vehicle identifier, a vehicle battery system configuration, a number of passengers, or a vehicle payload weight.

17. The apparatus of claim 11, wherein determine that an adverse situation is occurring further comprises:

determine that the updated predicted energy expenditure will exceed an energy reserve threshold associated with an energy reserve value of the vehicle.

18. The apparatus of claim 10, wherein the predicted energy visualization is characterized by at least one of a color-code, shading scheme, pattern, transparency, gradient, or a shape that is determined based on one or more predicted battery parameter values associated with the predicted energy expenditure.

19. A computer program product comprising at least one non-transitory computer-readable storage medium having computer program code stored thereon that, in execution with at least one processor, is configured to:

determine, based on inputting a vehicle profile and a first trip plan into a vehicle performance prediction model, a predicted energy expenditure of a vehicle by at least correlating the first trip plan with a battery state of function (SoF) associated with a vehicle battery system of the vehicle;

generate, based on the predicted energy expenditure, a predicted energy visualization representing the predicted energy expenditure of the vehicle based on the first trip plan, wherein the predicted energy visualization corresponds to at least one defined leg between a plurality of flight phases associated with a first trip route of the first trip plan, wherein the predicted energy visualization is displayed on a situation interface oriented along a particular axis, in relation to the at least one defined leg between the plurality of flight phases, and wherein the predicted energy visualization is plotted along at least one axis of the situation interface representing a position along the first trip route;

determine, via the vehicle performance prediction model, an updated predicted energy expenditure of the vehicle based on updated vehicle operation data collected in real-time, wherein the updated vehicle operation data comprises at least one portion of data associated with one or more factors affecting a current energy expenditure of the vehicle; and dynamically update the situation interface, in response to determining the updated predicted energy expenditure, to display an updated predicted energy visualization on the situation interface in relation to the at least one defined leg between the plurality of flight phases.

20. The computer program product of claim 19, wherein the computer program code, in execution with the at least one processor, is further configured to:

determine, based on determine the updated predicted energy expenditure, that an adverse situation is occurring;

in response to determining that the adverse situation is occurring:

display, via a remote vehicle operation interface, a plurality of recommendations for mitigating the adverse situation;

display, upon selection of a first recommendation of the plurality of recommendations, an alternate predicted energy visualization associated with an alternate predicted energy expenditure based on a respective alternate trip plan on the situation interface, wherein the alternate predicted energy visualization is displayed in relation to at least one defined leg between a plurality of flight phases associated with the alternate trip plan.

* * * * *